United States Patent
Bromand et al.

(10) Patent No.: US 12,488,787 B2
(45) Date of Patent: Dec. 2, 2025

(54) SYSTEM FOR PROCESSING VOICE REQUESTS INCLUDING WAKE WORD VERIFICATION

(71) Applicant: Spotify AB, Stockholm (SE)

(72) Inventors: Daniel Bromand, Boston, MA (US); Björn Erik Roth, Stockholm (SE); Nick Priem, Rotterdam (NE)

(73) Assignee: Spotify AB, Stockholm (SE)

( * ) Notice: Subject to any disclaimer, the term of this patent is extended or adjusted under 35 U.S.C. 154(b) by 318 days.

(21) Appl. No.: 18/090,064

(22) Filed: Dec. 28, 2022

(65) Prior Publication Data

US 2024/0221728 A1   Jul. 4, 2024

(51) Int. Cl.
   *G10L 15/22*   (2006.01)
   *G10L 15/08*   (2006.01)

(52) U.S. Cl.
   CPC ............ *G10L 15/08* (2013.01); *G10L 15/22* (2013.01); *G10L 2015/088* (2013.01); *G10L 2015/223* (2013.01)

(58) Field of Classification Search
   None
   See application file for complete search history.

(56) References Cited

U.S. PATENT DOCUMENTS

| | | | |
|---|---|---|---|
| 10,325,599 B1 * | 6/2019 | Naidu | G06F 40/295 |
| 10,748,543 B2 | 8/2020 | Mixter et al. | |
| 10,957,329 B1 | 3/2021 | Liu et al. | |
| 11,062,702 B2 | 7/2021 | Wood et al. | |
| 12,230,266 B1 * | 2/2025 | Henry | G10L 15/22 |
| 2016/0104480 A1 * | 4/2016 | Sharifi | G10L 15/22 704/254 |
| 2017/0025124 A1 * | 1/2017 | Mixter | G10L 15/32 |
| 2017/0076720 A1 * | 3/2017 | Gopalan | G10L 15/22 |
| 2018/0061420 A1 | 3/2018 | Patil et al. | |
| 2018/0108351 A1 * | 4/2018 | Beckhardt | G10L 15/32 |
| 2018/0204569 A1 | 7/2018 | Nadkar et al. | |
| 2018/0301147 A1 * | 10/2018 | Kim | G06F 3/167 |

(Continued)

FOREIGN PATENT DOCUMENTS

| TW | I683306 B | 1/2020 |
|---|---|---|
| WO | 2021114852 A1 | 6/2021 |
| WO | 2022/067345 A1 | 3/2022 |

OTHER PUBLICATIONS

Connectivity Standards Alliance, https://csa-iot.org/developer-resource/matter-network-transport/, published on Jun. 9, 2022 (Year: 2022).*

(Continued)

*Primary Examiner* — Seong-Ah A Shin
(74) *Attorney, Agent, or Firm* — McDonnell Boehnen Hulbert & Berghoff LLP

(57) ABSTRACT

A system for processing voice requests includes a voice assistant manager and a plurality of voice assistants. The voice assistant manager detects a wake word in an utterance and communicates the utterance to a voice assistant of the plurality of voice assistants. In some embodiments, the voice assistant may verify the detected wake word and communicate with a cloud service, which may also verify the detected wake word and generate a response to the utterance. In some embodiments, the voice assistant manager may activate or deactivate one or more of the voice assistants.

19 Claims, 17 Drawing Sheets

(56) References Cited

U.S. PATENT DOCUMENTS

| | | | |
|---|---|---|---|
| 2019/0341037 A1 | 11/2019 | Bromand et al. | |
| 2020/0184964 A1* | 6/2020 | Myers | G06F 3/167 |
| 2020/0302932 A1* | 9/2020 | Schramm | G10L 15/22 |
| 2020/0320997 A1 | 10/2020 | Wagatsuma et al. | |
| 2020/0365154 A1* | 11/2020 | Sindhwani | G06F 3/167 |
| 2020/0372907 A1 | 11/2020 | Trufinescu et al. | |
| 2022/0180867 A1 | 6/2022 | Bobboli et al. | |
| 2022/0189470 A1* | 6/2022 | Sharifi | G10L 15/22 |
| 2022/0230635 A1* | 7/2022 | Schillmoeller | G06F 3/0482 |
| 2022/0293097 A1* | 9/2022 | Jekeswaran | G06F 3/167 |
| 2022/0351724 A1* | 11/2022 | Thomas | G10L 15/08 |
| 2023/0090019 A1* | 3/2023 | Santhar | G10L 25/27 |
| | | | 709/201 |
| 2023/0097197 A1* | 3/2023 | Huang | G10L 15/22 |
| | | | 704/226 |
| 2023/0113883 A1* | 4/2023 | Carbune | G10L 15/22 |
| | | | 704/235 |
| 2024/0203413 A1* | 6/2024 | Sharifi | G10L 15/30 |

OTHER PUBLICATIONS

Tizan Docs Webpage: Multi-Assistant located at: https://docs.tizen.org/application/native/guides/text-input/multi-assistant/, obtained on Mar. 27, 2023, 7 pages.
Sonos Voice Control User Guide, online at: https://www.sonos.com/en-gb/guides/sonosvoicecontrol, obtained Mar. 27, 2023, 4 pages.
Getting Started with Universal Search and Browse on Fire TV, from Amazon webpage: https://developer.amazon.com/docs/catalog/getting-started-universal-search-and-browse.html, last updated Jan. 20, 2022, 7 pages.

\* cited by examiner

SYSTEM FOR PROCESSING VOICE REQUESTS INCLUDING WAKE WORD VERIFICATION

BACKGROUND

A user may interact with a voice assistant by providing a voice input that includes a request. For example, the user may ask the voice assistant to play media content, message a friend, or schedule an appointment. The voice assistant may process the request and generate a response. However, one voice assistant may not have all the functionality desired by a user, so a user may interact with more than one voice assistant.

Various challenges arise when a user may interact with multiple voice assistants. For example, a voice-enabled device may have limited resources, and each voice assistant may consume resources, particularly when the voice assistant is active. Additionally, as the number of voice assistants increases, the likelihood of making a mistake may also increase. For example, a voice assistant may be activated even if no voice assistant was called. The user may accidentally call one voice assistant when another would have been better equipped to handle a request. Information intended for one voice assistant may be incorrectly sent to a different voice assistant, an error which, among other things, may raise privacy concerns. Furthermore, managing an addition, removal, or change of a voice assistant may be a challenge as the number of available voice assistants increases.

SUMMARY

In general terms, this disclosure relates to a system for processing voice requests. In some examples, the system includes a voice assistant manager and a plurality of voice assistants. In some embodiments and by non-limiting example, the voice assistant manager may receive an utterance from a user and detect a wake word in the utterance. Based on the detected wake word, the voice assistant may, in some embodiments, communicate the utterance to a voice assistant, which may receive the utterance and detect the wake word for a second time. Further, in some embodiment, the voice assistant may communicate the utterance to a cloud service, which may process the utterance and detect the wake word for a third time.

One aspect is a system for processing voice requests, the system comprising a voice assistant manager, a plurality of voice assistants, a processor, and memory communicatively coupled to the processor. The memory stores instructions that, when executed by the processor, cause the voice assistant manager to receive an utterance from a user; detect a wake word in the utterance; identify, from the plurality of voice assistants, a called assistant associated with the wake word; and communicate the utterance to the called assistant; wherein the instructions, when executed by the processor, cause the called assistant to receive the utterance from the voice assistant manager; and verify the wake word.

Another aspect is method for processing voice requests, the method comprising receiving an utterance from a user; detecting, at a voice assistant manager, a wake word in the utterance; identifying, from a plurality of voice assistants, a called assistant associated with the wake word; communicating the utterance to the called assistant; detecting, at the called assistant, the wake word in the utterance; generating a response to the utterance; and transmitting the response to the user.

A further aspect is a device for processing voice commands, the device comprising a processor and memory coupled to the processor, the memory storing instructions that, when executed by the processor cause the device to receive an utterance; detect a wake word in the utterance; identify, from a plurality of voice assistants, a called assistant associated with the wake word; communicate the utterance to the called assistant; generate, at the called assistant, a response to the utterance; and transmit the response to the user.

DETAILED DESCRIPTION

Figure 1:
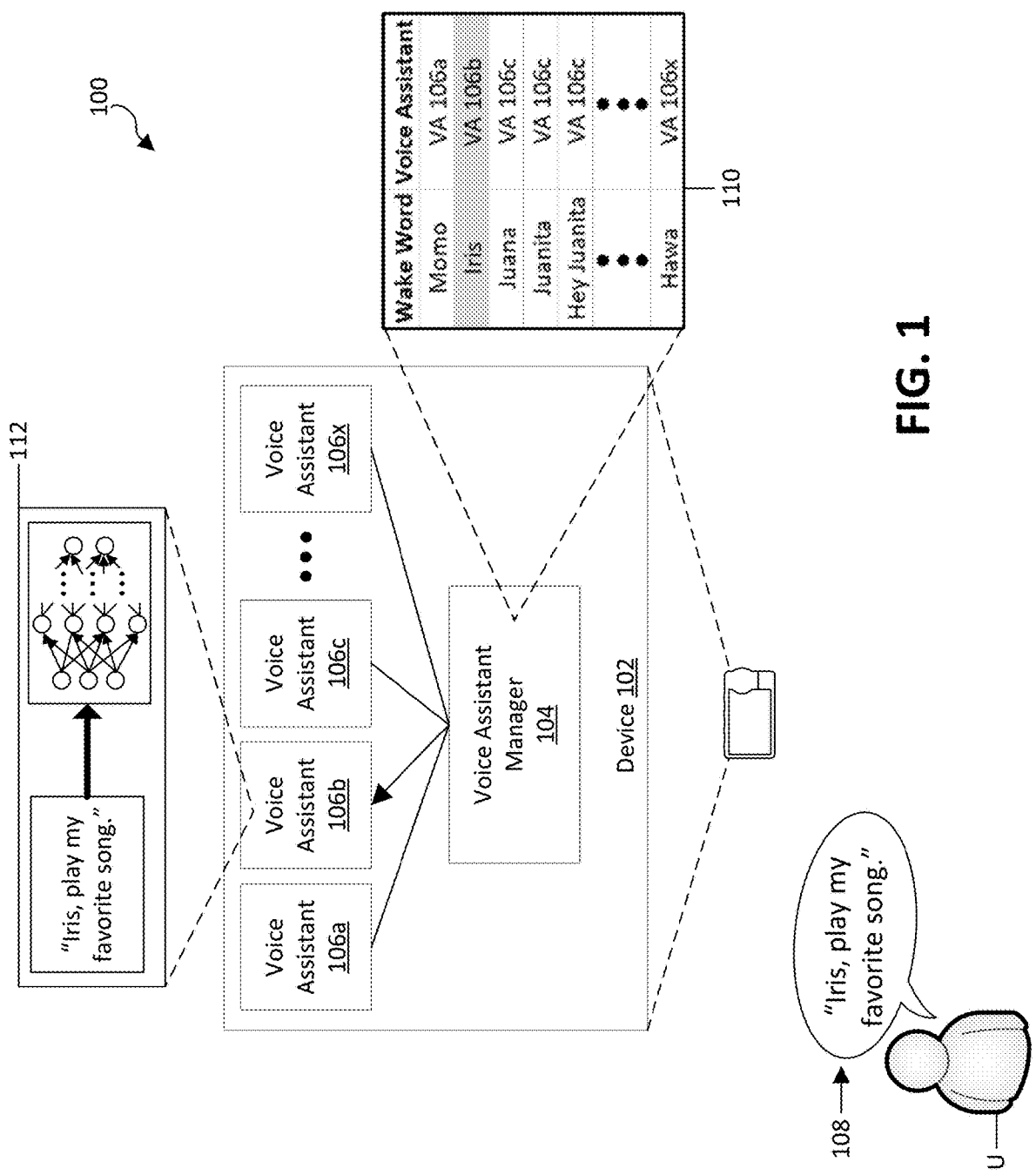
FIG. 1 illustrates aspects of an example system for processing a voice request.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 illustrates aspects of an example system 100 for processing a voice request. In the example shown, the system 100 includes a device 102. In some embodiments, the device 102 may include a voice assistant manager 104 and a plurality of voice assistants 106a-x. In some examples, the device 102 may receive an utterance 108 from a user U. In some embodiments, the voice assistant manager 104 may receive the utterance 108, detect a wake word, and determine, based at least in part on the detected wake word and wake word mapping data 110, which of the plurality of voice assistants 106a-x is called. The voice assistant manager 104 may then communicate the utterance to the called voice assistant (e.g., the voice assistant 106b). In some embodiments, the voice assistant manager 104 may send two files to the called voice assistant. One file may be unencrypted and include the wake word. The other file may be encrypted and include the utterance. The called voice assistant may receive the utterance and verify the wake word, as illustrated by the example wake word verification 112. In some embodiment, the called voice assistant may, upon successfully verifying the wake word, receive a decryption key for decrypting the encrypted file including the utterance.

The device 102 may be a computing device including a processor, memory, input and output components, non-transitory computer-readable media, and other computer components. An example of a computer system in which aspects of the device 102 may be implemented is further described below in connection with FIG. 17. In some embodiments, the device 102 may be a mobile device, such as a mobile phone, tablet, or smart device. In some embodiments, the device 102 may be a smart speaker. In some embodiments, the device 102 may be a device that is integrated into another system, such as a device that is embedded into a digital dashboard or into another car system. An example of the device 102 is illustrated and described below in connection with FIGS. 2-6 as the example device 130. The device 102 may include components for receiving, processing, and responding to a voice request. These components may include the voice assistant manager 104 and the plurality of voice assistants 106a-x.

The voice assistant manager 104 may be installed, as shown in the example of FIG. 1, on the device 102. The voice assistant manager 104 may perform operations related to processing voice requests and to managing voice assistants according to the voice requests. In some examples, the voice assistant manager 104 may communicate utterances to a voice assistant of the plurality of voice assistants 106a-x, activate and deactivate the voice assistants 106a-x, and manage subscriptions of the voice assistants 106a-x. The voice assistant manager 104 may be implemented as software, hardware, or a combination of software and hardware. Example components of the voice assistant manager 104 are further described below in connection with FIG. 7. Example operations of the voice assistant manager 104 are further described below in connection with FIGS. 11-12 and 15-16.

The plurality of voice assistants 106a-x may be installed, as shown in the example of FIG. 1, on the device 102. In some embodiments, one or more of the plurality of voice assistants 106a-x may not be installed on the device 102, but may be communicatively coupled to the device 102 via a local network. Further, one or more of the plurality of voice assistants 106a-x may be configured to send and receive communications pursuant to the Matter standard. Each voice assistant of the voice assistants 106a-x may include a service that can receive and process a voice request. As shown, the device 102 may include a plurality of voice assistants, and voice assistants may be added to or removed from the device 102. Example voice assistants of the voice assistants 106a-x include Siri, Alexa, Cortana, Google Assistant, Hey Spotify, or other services that may interact with a user via voice. In some examples, each voice assistant of the voice assistants 106a-x may be associated with a wake word, which a user may use to call a specific voice assistant. Furthermore, one or more of the voice assistants 106a-x may be associated with a cloud service that the device 102 may communicate with. Each assistant of the voice assistants 106a-x may be implemented as software, hardware, or a combination of software and hardware. Aspects of the voice assistants 106a-x are further described below.

In the example shown, the user U may speak the utterance 108, which may be detected and received by the device 102. The user U may be, for example, a person or a system that generates speech. In the example of FIG. 1, the utterance 108 is "Iris, play my favorite song." In some examples, the utterance 108 may include multiple parts. For example, the utterance 108 may include a wake word and a request. In the example utterance 108, the wake word may be "Iris," and the request may be "play my favorite song," which may include an action (e.g., "play") and one or more parameters (e.g., "my favorite song").

As shown in the example of FIG. 1, the wake word mapping data 110 may be used by the voice assistant manager 104 to select a voice assistant of the voice assistants 106a-x to communicate the utterance 108 to. In some embodiments, the voice assistant manager 104 may select one or more voice assistants of the voice assistants 106a-x based on semantic analysis of the utterance 108 (e.g., detecting a category or action of an utterance) and based on functionality offered by each of the voice assistants 106a-x. For example, the voice assistant manager 104 may select one or more voice assistants 106a-x that offers functionality required to fulfill an action requested by the utterance. In the example of FIG. 1, however, the voice assistant manager 104 may use a detected wake word and wake word mapping data 100 to select a voice assistant of the voice assistants 106a-x.

The wake word mapping data 110 may include a plurality of wake words (e.g., "Momo," "Iris," "Juana," "Juanita," etc. . . . ), each of which may be mapped to one of the voice assistants 106a-x. In some examples, a wake word may be one or more words that are associated with a voice assistant, or that may be used to call a voice assistant. In some embodiments, the voice assistant manager 104 may use a wake word detection model to detect a wake word or wake phrase in the utterance 108, as is further described below. In the example shown, the voice assistant manager 104 may, having detected "Iris" in the utterance 108, determine which of the voice assistants 106a-x is associated with the wake word "Iris" by using the wake word mapping data 110. In some embodiments, a wake word may be associated with a plurality of voice assistants of the voice assistants 106a-x (e.g., a wake word such as "weather" may be associated with a plurality of voice assistants that provide services related to the weather). In the example of FIG. 1, the wake word mapping data 110 may indicate that the wake word "Iris" is associated with the voice assistant 106b. Thus, the voice assistant manager 104 may communicate the utterance 108 to the voice assistant 106b, as indicated by the arrow from the voice assistant manager 104 to the voice assistant 106b.

As illustrated by the example wake word verification 112, the voice assistant 106b may verify that the wake word (e.g., "Iris") is, in fact, present in the utterance 108. For example, the voice assistant 106b may input the utterance 108 into a model that is trained to detect a wake word that is associated with the voice assistant 106b. In the example wake word verification 112, a representation of the utterance 108 is input into a model for detecting whether a wake word associated with the voice assistant 106b is present. Furthermore, as is further described below, the voice assistant 106b may, in some embodiments, communicate the utterance 108 to a cloud service in response to successfully verifying the wake word. Furthermore, if the voice assistant 106b fails to verify the wake word, the voice assistant 106b may return an error to the voice assistant manager 104, which may then delete data associated with the utterance 108 and deactivate the voice assistant 106b. For example, the voice assistant manager 104 may delete from memory an audio file associated with the utterance and may delete activity data related to having received the utterance. As a result, the voice assistant manager 104 does not, in some embodiments, retain data related to user speech that was not directed at any of the voice assistants 106a-x. Furthermore, by deactivating the voice assistant that failed to verify the wake word, the deactivated voice assistant may, in some embodiments, be removed from memory (e.g., RAM), thereby freeing computer resources for other tasks.

As illustrated in the example of FIG. 1, a plurality of voice assistants 106a-x may be present on the same device 102. As a result, when directing a voice request to the device 102, a user may select from any of the voice assistants 106a-x, thereby empowering the user to select a particular voice assistant for a particular request, while also having other voice assistants available. Additionally, the voice assistant manager 104 may first determine whether a wake word is present in an utterance, thereby removing the need for each of the voice assistants 106a-x to be actively listening for its wake word. Yet still, because a voice assistant may also verify its wake word, the chance for false positives (e.g., incorrectly processing an utterance from a user when the user did not intend for the utterance to be processed) may decrease. Thus, aspects of the present disclosure not only integrate multiple voice assistants on a single device, but also manage some challenges of having multiple voice assistants, such as the chance of false positives or the impact on computer resources that multiple voice assistants on a single device may have.

Figure 2:
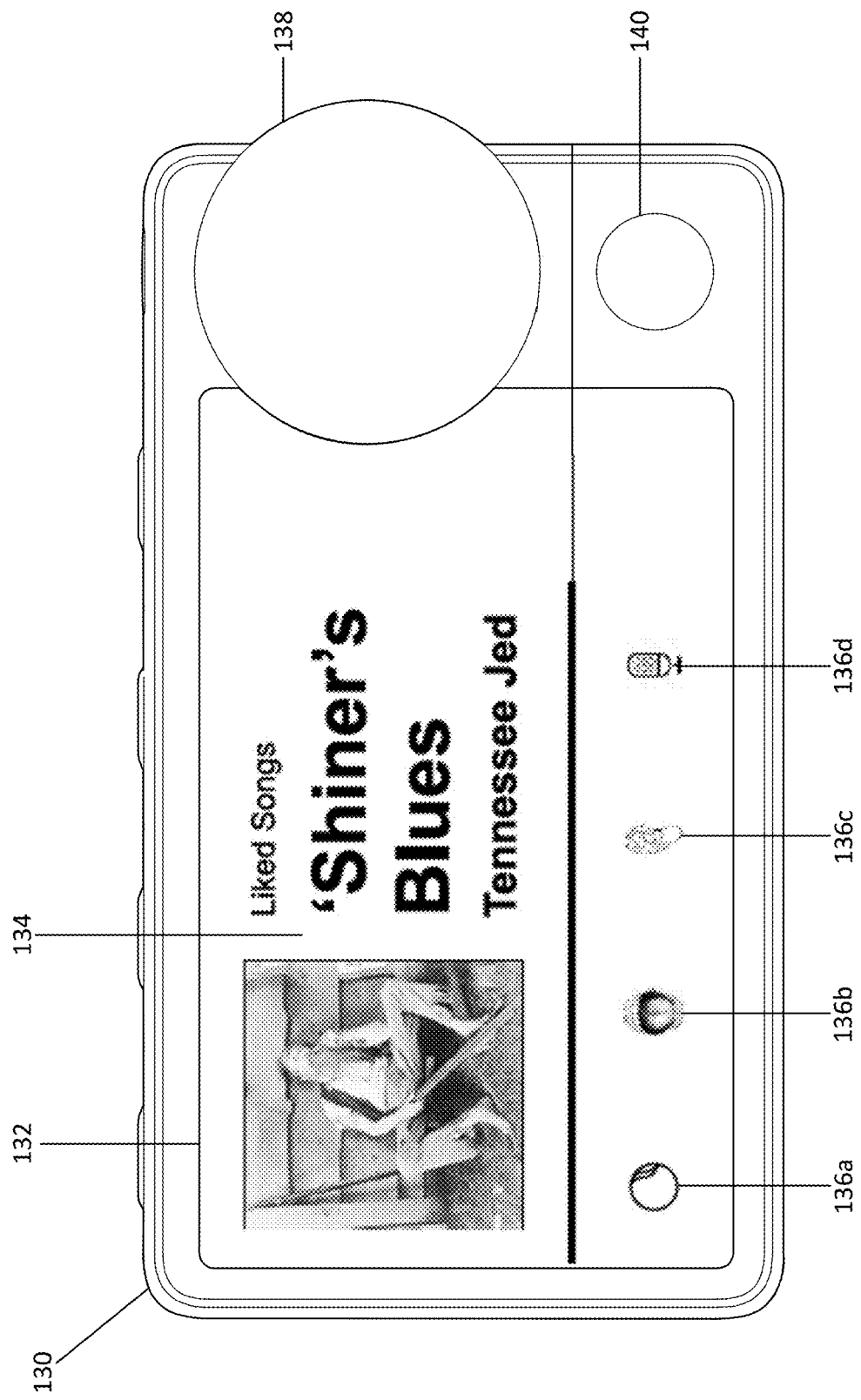
FIG. 2 illustrates an example device in which aspects of the present disclosure may be implemented.

FIG. 2 illustrates an example device 130 with which aspects of the present disclosure may be implemented. In the example shown, the device 130 includes a user interface 132, content 134, a plurality of voice assistant icons 136a-d, a radial dial 138, and a button 140.

The device 130 is an example of the device 102 of FIG. 1. For example, the device 130 may include the voice assistant manager 104 and the plurality of voice assistants 106a-x. However, depending on the embodiment, the device 102 may be a different device than the device 130. Furthermore, depending on the embodiment, the device 102 may include different components than those illustrated as part of the device 130. In addition to the components shown, the device 130 may also include a speaker, microphone, and computer components, such as those described in connection with FIG. 17. The device 130 may include a screen for displaying content. In some embodiments, the screen may be a touch screen.

In the example shown, the user interface 132 is displayed on the screen of the device 130. The user interface 132 may include content, such as the content 134, and the user interface 132 may include one or more input fields. For example, the user interface 132 may include an input field for receiving text or an input field that may be selected. In the example of FIG. 2, the content 134 includes data related to media that is being played. For examples, the content 134 includes a playlist ("Liked Songs"), a song name ("'Shiner's Blues"), an artist ("Tennessee Jed"), an image, and a status bar. Depending on the content and type of content, the data displayed in the user interface 132 may vary.

The user interface 132 may also include a plurality of voice assistant icons 136a-d. In some embodiments, each of the voice assistant icons 136a-d may be a small image, one or more shapes, or another visual representation. In some embodiments, each of the voice assistant icons 136a-d may correspond to a voice assistant (e.g., a voice assistant of the voice assistants 106a-x) that is available on the device 130. In some embodiments, one or more of the voice assistant icons 136a-d may be text—or include text—such as a wake word of an associated voice assistant. In some embodiments, the user interface 132 may display the voice assistant icons 136a-d in response to one or more of a user voice command related to voice assistants or a user input via the radial dial 138, the button 140, or a touch of the display of the device 130.

In some examples, each of the voice assistants 106a-x that are available on a device may correspond to a voice assistant icon that is displayed in the user interface 132. In other examples, only some of the voice assistants 106a-x may have an icon that is displayed in the user interface 132. Furthermore, in some examples, an icon of the voice assistant icons 136a-d may be associated with an action type or category associated with one or more of the voice assistants 106a-x. For example, the voice assistant icons 136a-d may include an icon that looks like a storm cloud, and the storm cloud icon may be associated with one or more of the voice assistants 106a-x that provide weather-related functionality. In such an example, the user may select the storm cloud icon to direct an utterance to the one or more voice assistants 106a-x associated with that icon. By displaying voice assistant icons 136a-d in the user interface 132, a user may be able to determine what voice assistants are available on the device 130, and the user may know what wake words and requests may be directed at the device 130.

The radial dial 138 may be a physical dial that a user may use to interact with the device 130. In some embodiments, the user may rotate the dial 138 to select an option displayed in the user interface 132 or to alter a setting of the user interface 132 or the device 130 (e.g., a sound setting or a content display size). In some examples, a user may use the radial dial 138 to select a voice assistant of the plurality of voice assistants 106a-x or to interact with the voice assistant manager 104. In some embodiments, a user may touch or press the radial dial 138 to interact with the device 130 or the user interface 132. The button 140 may be a physical button that a user may use to interact with the device 130 or the user interface 132.

Figure 3:
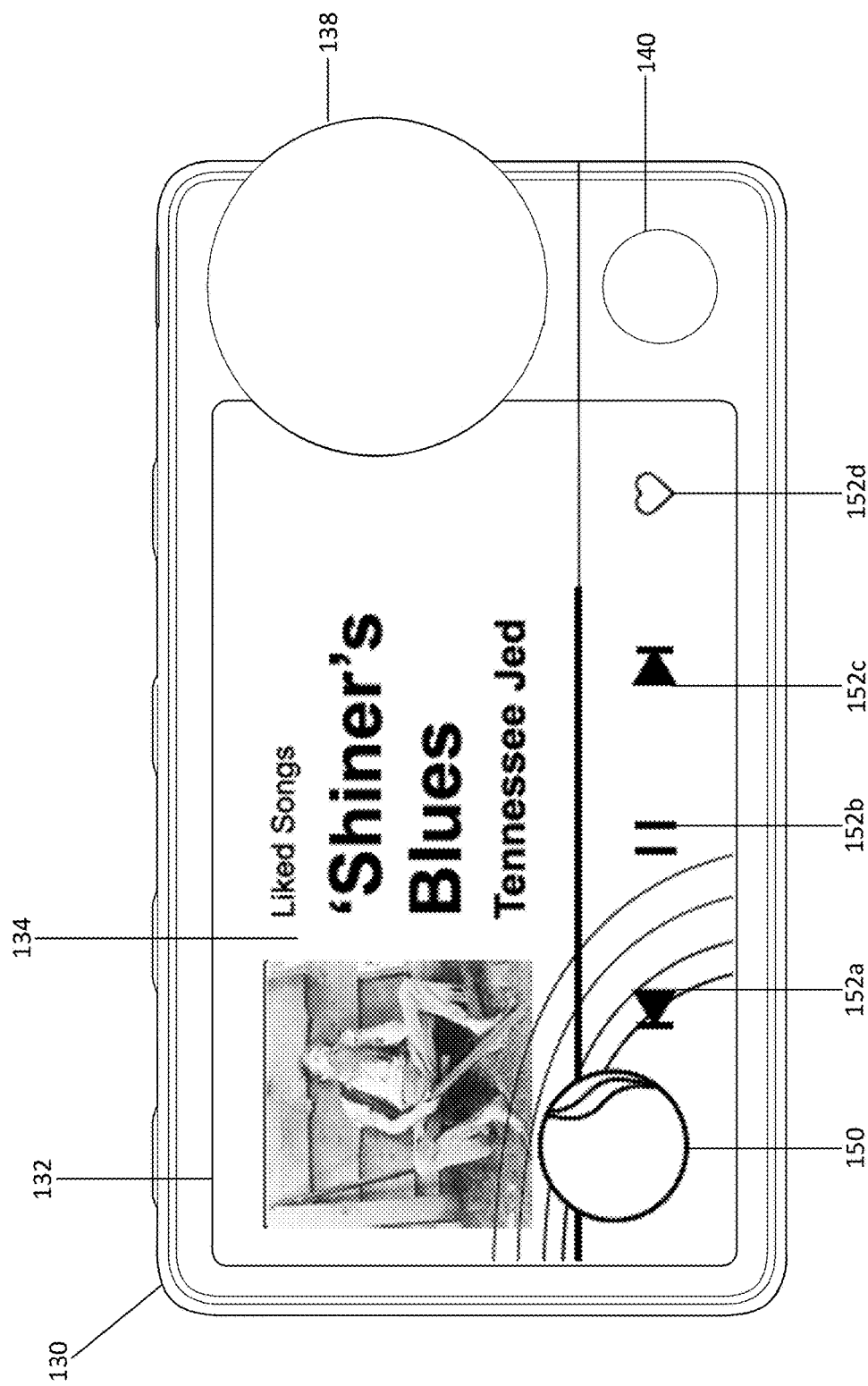
FIG. 3 illustrates an example device in which aspects of the present disclosure may be implemented.
Figure 4:
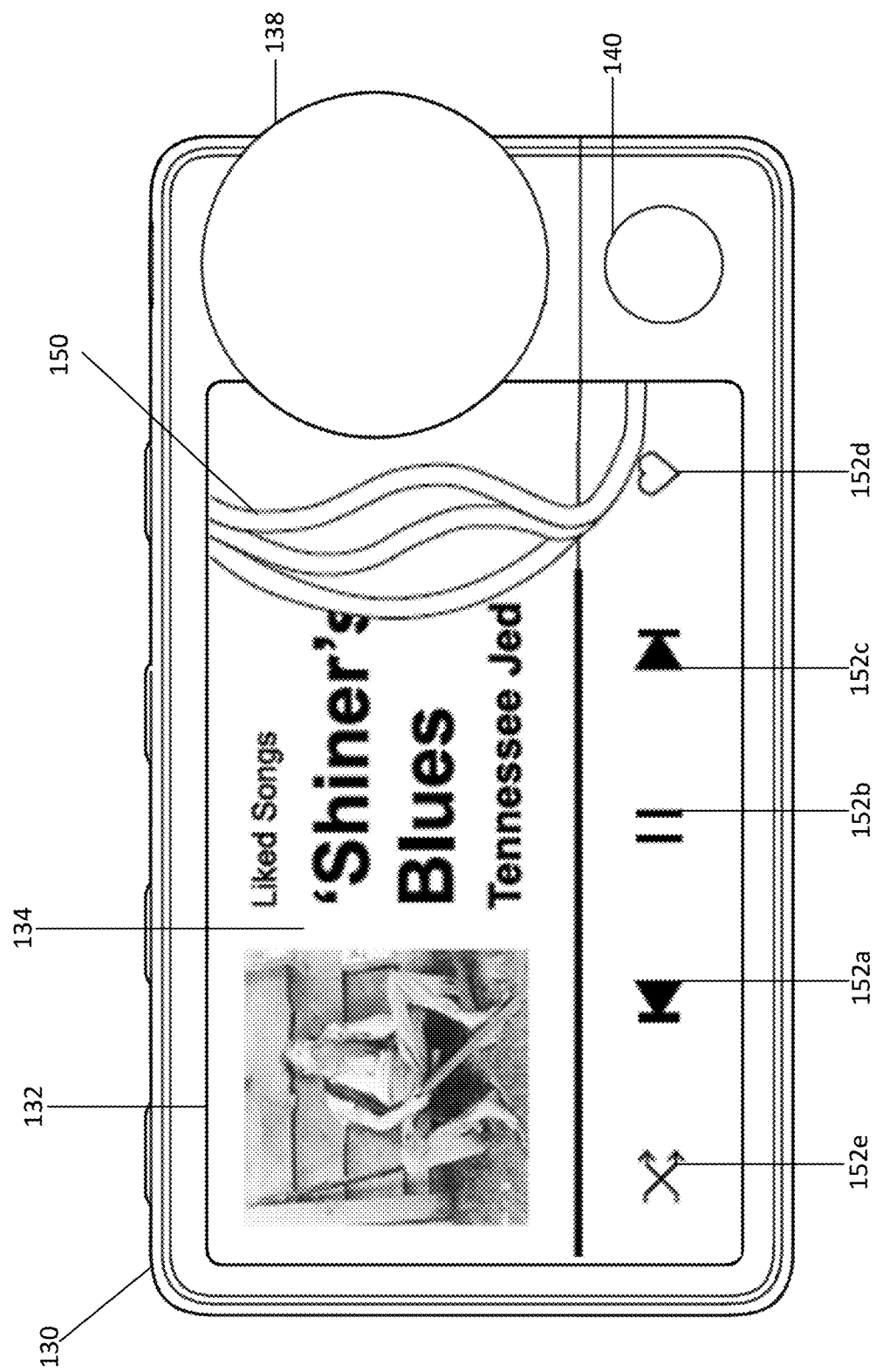
FIG. 4 illustrates an example device in which aspects of the present disclosure may be implemented.

FIGS. 3-4 further illustrate the example device 130 of FIG. 2. In the examples of FIGS. 3-4, the device 130 includes the user interface 132, the radial dial 138, and the button 140. The user interface 132 includes content 134, a called assistant icon 150, and a plurality of input fields 152a-d. In some embodiments, a user may use the plurality of input fields 152a-d to interact with the device 130, with components of the device 130, with the user interface 132, or with the content 134. Depending on the embodiments and the content displayed, the user interface 132 may include more, less, or different input fields than the input fields 152a-d (e.g., the example of FIG. 4 includes the input field 152e).

In the example shown, the called assistant icon 150 is an icon that is associated with one of the voice assistants 106a-x. Furthermore, in the example shown, the called assistant icon 150 is an enlarged or altered version of one of the voice assistant icons 136a-d of FIG. 2. In other embodiments, the called assistant icon 150 may not be a variation of any of the voice assistant icons 136a-d but nevertheless may be associated with one of the voice assistants 106a-x. In some embodiments, the called assistant icon 150 may be a color, shape, shading, or other visual representation.

In the example of FIG. 3, the called assistant icon 150 is in the lower-left corner of the user interface 132; in the example of FIG. 4, the called assistant icon 150 is on the right side of the user interface 132; in other embodiments, the called assistant icon 150 may appear in other areas of the user interface 132. In some embodiments, the called assistant icon 150 may indicate that a user is interacting with the voice assistant associated with the called assistant icon 150. For example, if the voice assistant manager 104 detects a wake word in an utterance and identifies a called voice assistant associated with the wake word (as is further described below in connection with FIGS. 11-12), then an icon associated with the called assistant may be displayed as the called assistant icon 150. Furthermore, in some embodiments, the called assistant icon 150 may indicate that an associated voice assistant is active. Furthermore, the user interface 132 may display other data that indicates an action being performed by a called voice assistant. For example, the called assistant icon 150 may be displayed with a sound wave to illustrate that the called voice assistant is outputting a response, or the user interface 132 may include other data illustrating that a voice assistant is processing a request or verifying a wake word.

Figure 5:
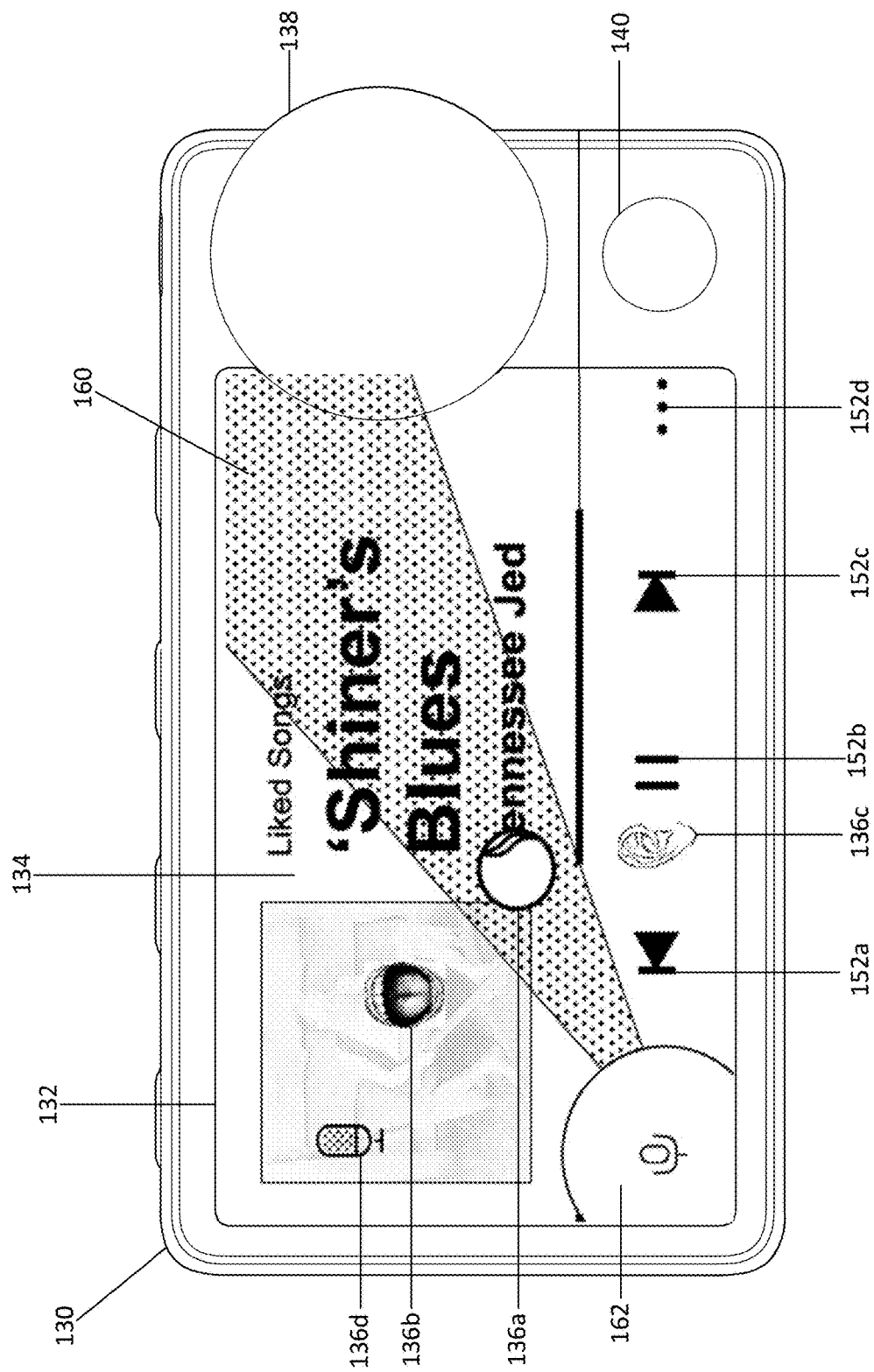
FIG. 5 illustrates an example device in which aspects of the present disclosure may be implemented.
Figure 6:
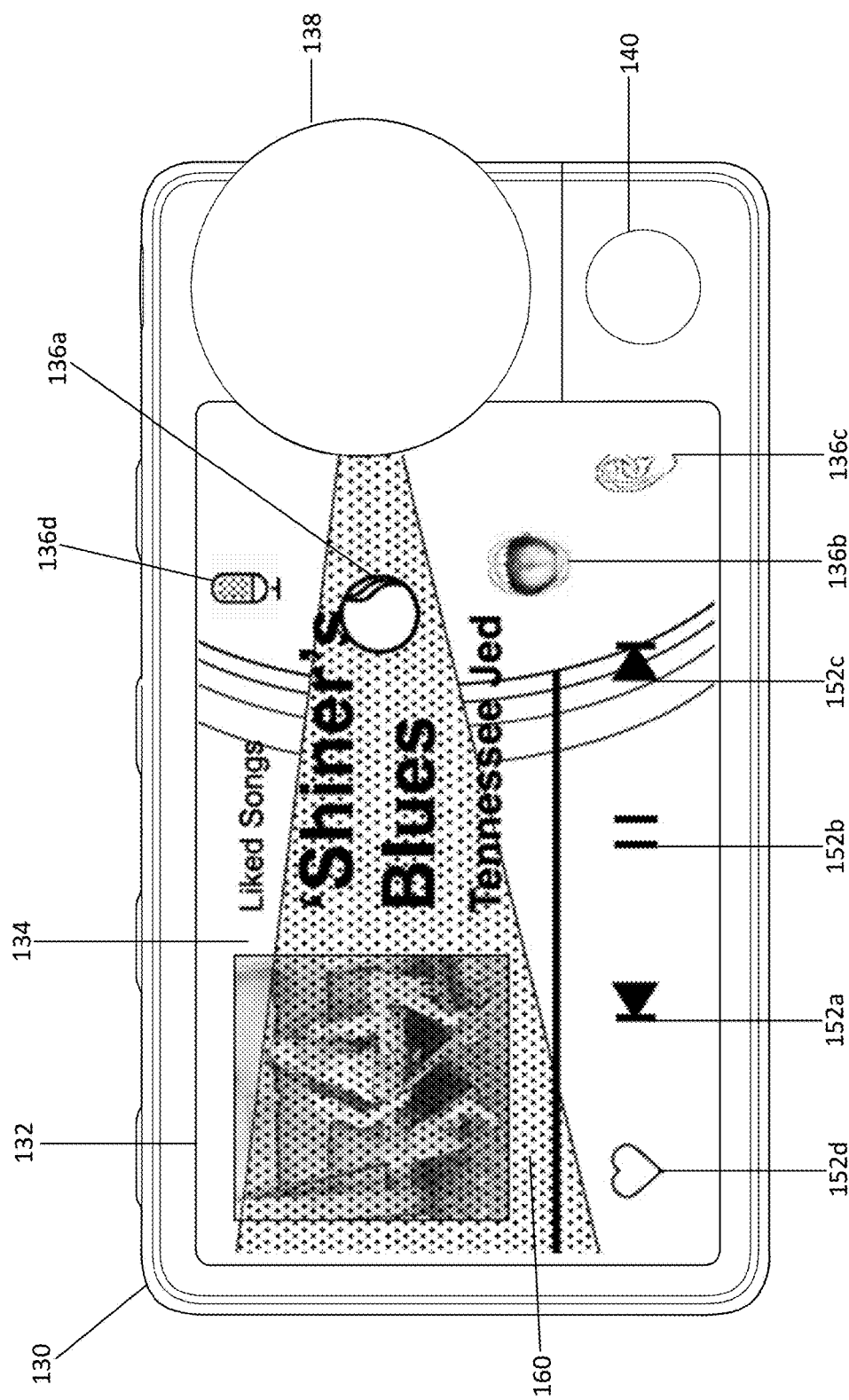
FIG. 6 illustrates an example device in which aspects of the present disclosure may be implemented.

FIGS. 5-6 further illustrate the device 130 of FIGS. 2-4. In the examples of FIGS. 5-6, the device 130 includes the user interface 132, the radial dial 138, and the button 140. The user interface 132 includes content 134, the plurality of voice assistant icons 136a-d, and a plurality of input fields 152a-d. Additionally, in FIGS. 5-6, the user interface 132 includes a selected assistant field 160. In the example of FIG. 5, the voice assistant icons 136a-d are disposed in an arc around a microphone dial 162. In the example of FIG. 6, the voice assistant icons 136a-d are disposed in an arc around the radial dial 138.

In some embodiments, the user interface 132 may display the voice assistant icons 136a-d, as shown in the examples of FIGS. 5-6, in response to a user input. For example, the user may transmit a vocal request for the device 130 to display available assistants. Furthermore, in some embodiments, the use may use the radial dial 138 or the button 140 to trigger a display of available assistants. In some embodiments, the voice assistant manager 104 may determine what assistants belong to the voice assistants 106a-x and display one or more icons associated with the voice assistants 106a-x.

In some embodiments, the selected assistant field 160 may indicate (e.g., by shading or by another visual representation) one or more selected voice assistants of the voice assistants 106a-x. For instance, in response to detecting a wake word and identifying a called assistant (operations that are further described below), the voice assistant manager 104 or another component of the device 130 may cause the user interface to include, in the selected assistant field 160, an icon of the voice assistant icons 136a-d associated with the called voice assistant. Additionally, in some embodiments, a user may touch the user interface 132, press the button 140, or use the radial dial 138 to call a voice assistant, as opposed to using a wake word associated with the called assistant. In such examples, the selected assistant field 160 may indicate which voice assistant the user is calling.

Figure 7:
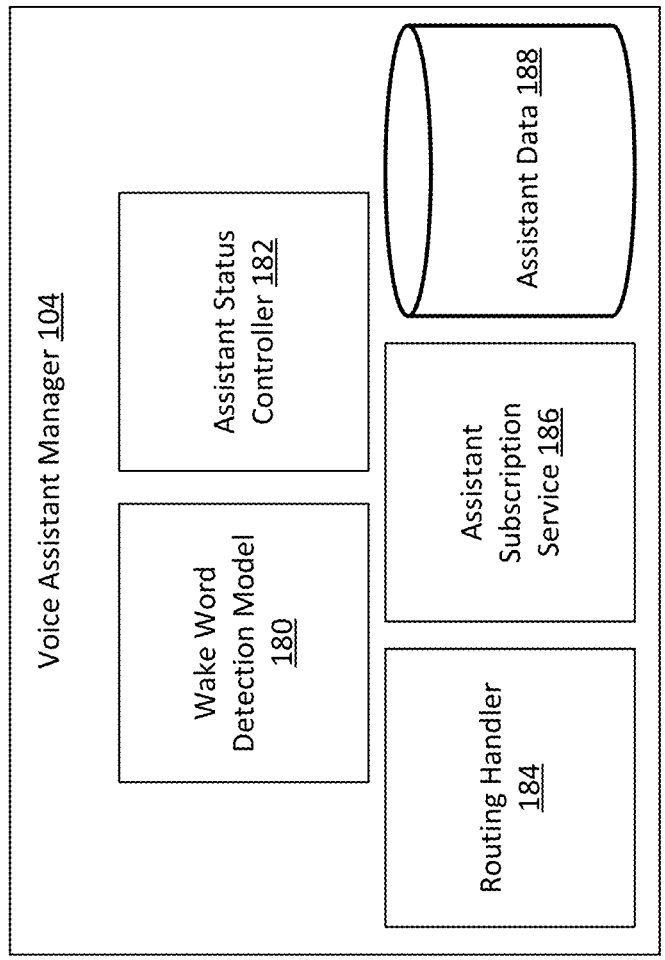
FIG. 7 illustrates a schematic block diagram of example aspects of a voice assistant manager.

FIG. 7 illustrates a schematic block diagram of example aspects of the voice assistant manager 104. In the example shown, the voice assistant manager 104 includes a plurality of components, including a wake word detection model 180, an assistant status controller 182, a routing handler 184, an assistant subscription service 186, and assistant data 188. Each of the components of the voice assistant manager 104 may be implemented using software, hardware, or a combination of software and hardware. Additionally, in some examples, the voice assistant manager 104 may include more or less components than those illustrated in the example of FIG. 7. Furthermore, depending on the embodiment, components of the voice assistant manager 104 may be configured to perform different operations than those described herein. Additionally, depending on the embodiment, an operation may be performed by a different component—or combination of components—than described herein.

The wake word detection model 180 may be a model for detecting a wake word in an utterance. For example, when the voice assistant manager 104 receives an utterance, the voice assistant manager 104 may input the utterance into the wake word detection model 180 to determine whether the utterance includes a wake word. The wake word detection model 180 may be a natural language processing model. In some examples, the wake word detection model may implement machine learning techniques (e.g., the model may be based on a neural network). The wake word detection model 180 may be trained to recognize a plurality of wake words (e.g., the wake words associated with the voice assistants 106a-x of FIG. 1). As is further described below, the voice assistant manager 104 may update the wake word detection model 180 as wake words associated with voice assistants change, as voice assistants are removed from the device 102, or as new voice assistants subscribe to the voice assistant manager 104 and are added to the voice assistants 106a-x.

The assistant status controller 182 may control whether the voice assistants 106a-x are active or deactivated. For instance, in some embodiments, not all of the voice assistants 106a-x may be active at the same time. As a result, when the voice assistant manager 104 detects that a particular voice assistant of the voice assistants 106a-x is called, then the voice assistant manager 104 may use the assistant status controller 182 to activate the called voice assistant prior to communicating the utterance. Additionally, the voice assistant manager 104 may use the assistant status controller 182 to deactivate a voice assistant.

The routing handler 184 may handle receiving and sending communications. In some embodiments, the routing handler 184 may send an utterance to a selected voice assistant, receive a response from the voice assistant, and transmit a response to a user. Additionally, in some embodiments, the routing handler 184 may determine when to send a communication. For example, the routing handler 184 may delay or schedule transmission of an utterance to a called voice assistant if that voice assistant is already processing a request. Furthermore, as is further described below, the routing handler 184 may, in some embodiments, determine that two or more utterances are related and combine them before sending the first to a voice assistant, or send them both to the same voice assistant. In some embodiments, the routing handler 184 may be configured to send and receive communications pursuant to the Matter standard, thereby enabling the voice assistant manager 104 to communicate with Matter-enabled devices and systems.

The assistant subscription service 186 may handle the subscription of a new voice assistant, manage a change to voice assistant data, or unsubscribe a voice assistant that is being removed. In some examples, the voice assistant manager 104 may expose the assistant subscription service 186 using an application programming interface (API) that a voice assistant may call to subscribe to the voice assistant manager 104. As part of subscribing a voice assistant, the assistant subscription service 186 may receive data related to a voice assistant, such as the following: one or more wake words or wake phrases associated with the voice assistant, a category of the voice assistant, or a functionality of the voice assistant. The assistant subscription service 186 may also communicate with other components of the voice assistant manager 104 regarding changes to a voice assistant. For example, the assistant subscription service 186 may cause the wake word detection model 180 to train to recognize one or more new wake words associated with a subscribing voice assistant.

The assistant data 188 may be a data store that includes data related to the voice assistants 106*a*-*x*. For example, the wake word mapping data 110 may be stored in the assistant data 188. Furthermore, the assistant data 188 may include other data related to assistants (e.g., historical usage of assistants, user-assistant preferences, assistant functionality, or other data that may relate to the voice assistants 106*a*-*x*).

Figure 8:
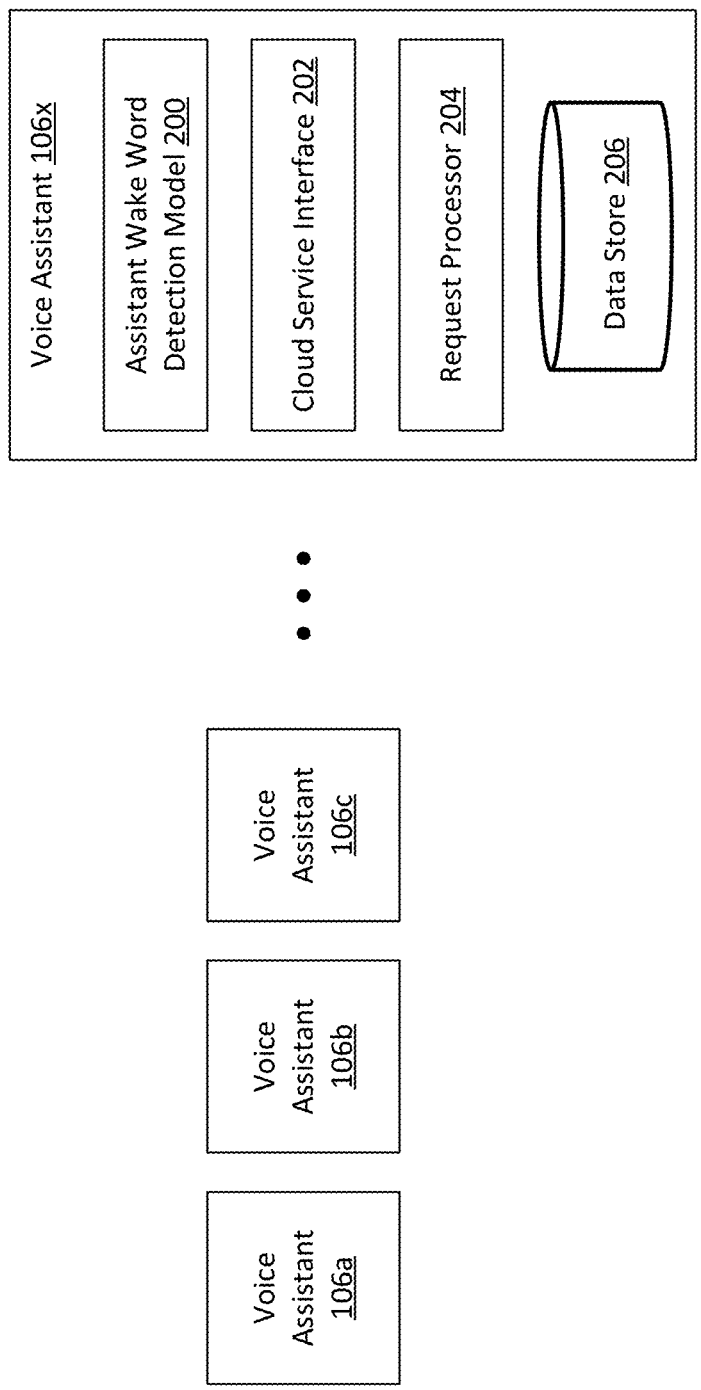
FIG. 8 illustrates a schematic block diagram of example aspects of voice assistants.

FIG. 8 illustrates a schematic block diagram of example aspects of the plurality of voice assistants 106*a*-*x*, which, as illustrated in the example of FIG. 1, may be installed on the device 102. In other examples, however, the voice assistants 106*a*-*x* may not be installed on the device 102. For example, one or more of the voice assistants 106*a*-*x* may be communicatively coupled to the device 102 via a network (e.g., a local Wi-Fi network). Furthermore, in some embodiments, one or more of the voice assistants 106*a*-*x* may be configured to send and receive communications pursuant to the Matter standard. The plurality of voice assistants 106*a*-*x* may include two or more voice assistants. In some embodiments, the number of voice assistants belonging to the voice assistants 106*a*-*x* may depend on how many voice assistants are associated with the voice assistant manager 104, how many voice assistants have subscribed to the voice assistant manager 104, or how many voice assistants are installed on the device 102.

In FIG. 8, example components of an example voice assistant 106*x* are shown. The example components of the example voice assistant 106*x* include an assistant wake word detection model 200, a cloud service interface 202, a request processor 204, and a data store 206. Each of the components of the voice assistant 106*x* may be implemented using software, hardware, or a combination of software and hardware. Additionally, in some examples, the voice assistant 106*x* may include more or less components than those illustrated in the example of FIG. 8. Furthermore, depending on the embodiment, components of the voice assistant 106*x* may be configured to perform different operations than those described herein. Additionally, depending on the embodiment, an operation may be performed by a different component—or combination of components—than described herein.

The assistant wake word detection model 200 may be a model for detecting a wake word. For example, the voice assistant 106*x* may be associated with one or more wake words. The assistant wake word detection model 200 may determine whether these one or more wake words are present in an utterance. For example, the voice assistant 106*x* may receive an utterance from the voice assistant manager 104, which may have detected a wake word associated with the voice assistant 106*x* in an utterance. The voice assistant 106*x* may use the assistant wake word detection model 200 to verify whether the utterance contains a wake word associated with the voice assistant 106*x*. The assistant wake word detection model 200 may be a machine learning model that is trained to recognize one or more wake words associated with the voice assistant 106*x* in speech. By performing a verification at the voice assistant 106*x* of the wake word, the likelihood that the voice assistant 106*x* processes an utterance that was not meant for the voice assistant 106*x* is reduced, particularly because the wake word will have been detected twice-once by the voice assistant manager 104 and again by the voice assistant 106*x*. In some embodiments, each of the voice assistants 106*a*-*x* may include a different assistant wake word detection model that is tailored to detect wake words associated with that voice assistant.

The cloud service interface 202 may communicate with a cloud service associated with the voice assistant 106*x*. As is further described below, the voice assistant 106*x* may be associated with a cloud service that is communicatively coupled to the voice assistant 106*x*, and that fulfills a request directed at the voice assistant 106*x*. The cloud service interface 202 may open a socket and perform other operations to communicate with the cloud service associated with the voice assistant 106*x*. In some embodiments, one or more of the voice assistants 106*a*-*x* may serve as a gateway to an associated cloud service. For example, the voice assistants 106*x* may be communicatively coupled to the device 102 over a network with a standardized communication protocol, such as a Matter protocol. The device 102 may, in some embodiments, communicate over a network using the Matter protocol with the voice assistant 106*x*, which may then communicate with an associated cloud service, thereby exemplifying that the voice assistant 106*x* may, in some embodiments, operate in a local network as a Matter-enabled gateway to a cloud service. As a result, a device communicatively coupled via a network to the voice assistant 106*x* using the Matter protocol may also be communicatively coupled to a cloud service associated with the voice assistant 106*x*.

The request processor 204 may process a request from a user. For example, in some embodiments, the voice assistant 106*x* may process a request locally, rather than sending the request to a cloud service. The request processor 204 may fulfill a request and generate a response. In some embodiments, the voice assistant 106*x* may process some requests locally while sending other requests to an associated cloud service.

The data store 206 may include data that is usable by other components of the voice assistant 106*x* or by systems that interact with the voice assistant 106*x*. For example, the data store 206 may include data related to the device 102, the voice assistant manager 104, or to an associated cloud service. Furthermore, the data store 206 may include data related to users or to previous requests and responses. For example, the data store 206 may include user preferences or other information related to users. Additionally, in some examples, the data store 206 may include a cache having data related to a recent conversation with a user.

Figure 9:
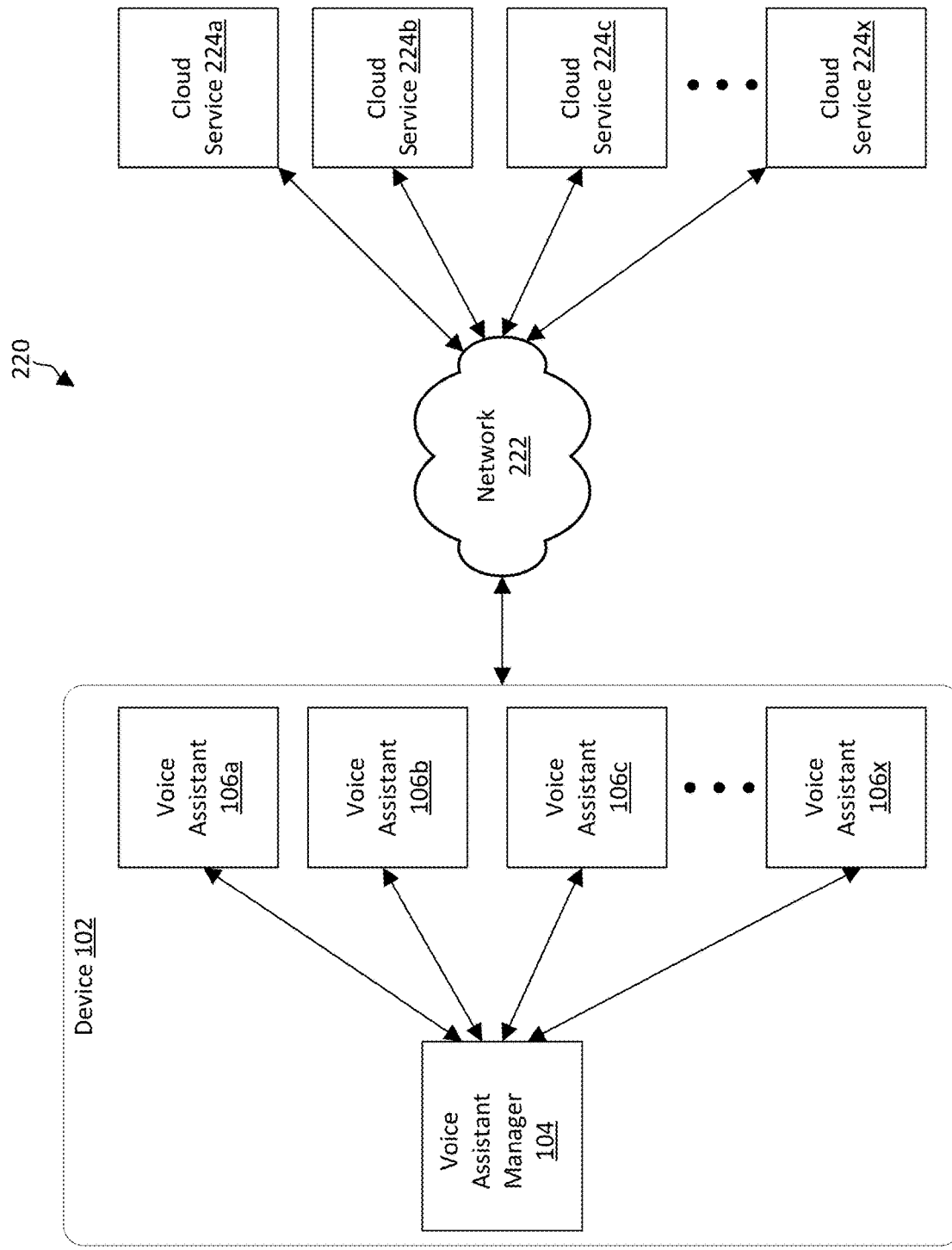
FIG. 9 illustrates an example network environment in which aspects of the present disclosure may be implemented.

FIG. 9 illustrates an example network environment 220 in which aspects of the present disclosure may be implemented. In the example of FIG. 9, the environment 220 includes the device 102, the network 222, and a plurality of cloud services 224*a*-*x*. As described above, the device 102 may include a voice assistant manager 104 and a plurality of voice assistants 106*a*-*x*.

In some embodiments, however, the device 102 may not implement one or more of the voice assistants 106*a*-*x*. For example, the voice assistant manager 104 may be communicatively coupled to one or more of the voice assistants 106*a*-*x* via a local wireless or wired network. In some embodiments, one or more of the voice assistants 106*a*-*x* may be compatible with the Matter standard (e.g., a proprietary standard for facilitating communication between devices across different vendors) to enable communication between the device 102 and the voice assistants 106*a-x*, between the voice assistants 106*a-x* themselves, or between the voice assistants 106*a-x* and IoT devices.

As shown, the network 222 may communicatively couple the device 102 with the plurality of cloud services 224*a-x*. The network 222 may be, for example, a wireless network, a virtual network, the Internet, or another type of network. Additionally, the network 222 may be divided into subnetworks, and the subnetworks may be different types of networks.

The cloud services 224*a-x* may be services that are associated with the voice assistants 106*a-x*. For example, the voice assistant 106*a* may be associated with the same company, product, or service as the cloud service 224*a*; the voice assistant 106*b* may be associated with the same company, product, or service as the cloud service 224*b*; the voice assistant 106*c* may be associated with the same company, product, or service as the cloud service 224*c*; and so on. In other examples, however, an associated voice assistant and cloud service may not be associated with the same company, product, or service, but the voice assistant may nevertheless call the cloud service to process a request (e.g., if the cloud service is a third party that offers cloud-based services). In some examples, a voice assistant of the voice assistants 106*a-x* may be associated with more than one of the cloud services 224*a-x*, or a voice assistant of the voice assistants 106*a-x* may not be associated with any of the cloud services 224*a-x*. Each of the cloud services 224*a-x* may run on one or more servers and may be made up of a combination of software and hardware, or abstracted hardware. The cloud services 224*a-x* are further described below in connection with, for example, FIGS. 10 and 14.

Figure 10:
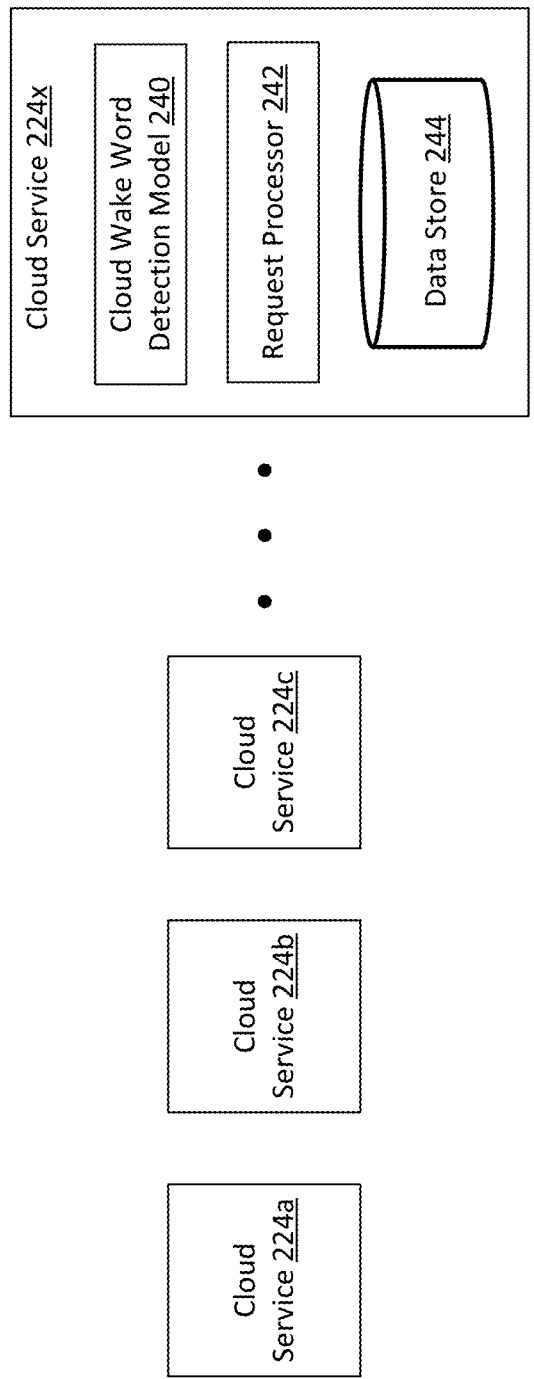
FIG. 10 illustrates a schematic block diagram of example aspects of cloud services.

FIG. 10 illustrates a schematic block diagram of example aspects of cloud services 224*a-x*. As illustrated in the example of FIG. 9, the cloud services 224*a-x* may be implemented in the network environment 220. The number of cloud services in the cloud services 224*a-x* may depend on how many cloud services are used by or associated with the voice assistants 106*a-x*.

In FIG. 10, example components of an example cloud service 224*x* are shown. The example components of the example cloud service 224*x* include a cloud wake word detection model 240, a request processor 242, and a data store 244. In some examples, the cloud service 224*x* may include more or less components than those illustrated in the example of FIG. 10. Furthermore, depending on the embodiment, components of the cloud service 224*x* may be configured to perform different operations than those described herein. Additionally, depending on the embodiment, an operation may be performed by a different component—or combination of components—than described herein.

The cloud wake word detection model 240 may be a model for detecting a wake word. As described above, the example cloud service 224*x* may be associated with an example voice assistant 106*x*. The cloud wake word detection model 240 may determine whether a wake word associated with the example voice assistant 106*x* is present in an utterance. For example, the cloud service 224*x* may receive an utterance form the voice assistant 106*x*, which may have verified a wake word associated with the voice assistant 106*x* in an utterance. The cloud service 224*x* may use the cloud wake word detection model 240 to check—for a third time, after the voice assistant manager 104 and after the voice assistant 106*x*—whether the utterance contains a wake word associated with the voice assistant 106*x*. The cloud wake word detection model 240 may be a machine learning model that is trained to recognize the wake words associated with the voice assistant 106*x* in speech. By verifying the wake word at the cloud wake word detection model 240, the likelihood that an utterance is incorrectly processed by a voice assistant may be further decreased.

The request processor 242 may process a request from a user. For example, the request processor 242 may apply one or more processors, memory units, and data of the cloud service 224*x* to fulfill a request from a user, a process that is further described below in connection with FIG. 14. The data store 244 may include data that is usable by other components of the cloud service 224*x* or by systems that interact with the cloud service 224*x*. For example, the data store 244 may include data related to the device 102, the voice assistant manager 104, or to an associated voice assistant. Furthermore, the data store 244 may include data related to users or to previous requests and responses. For example, the data store 244 may include user preferences or other information related to users. Additionally, in some examples, the data store 244 may include a cache having data related to a recent conversation with a user. Aspects of the cloud service 224*x* and other cloud services are further described below in connection with FIGS. 14-15.

Figure 11:
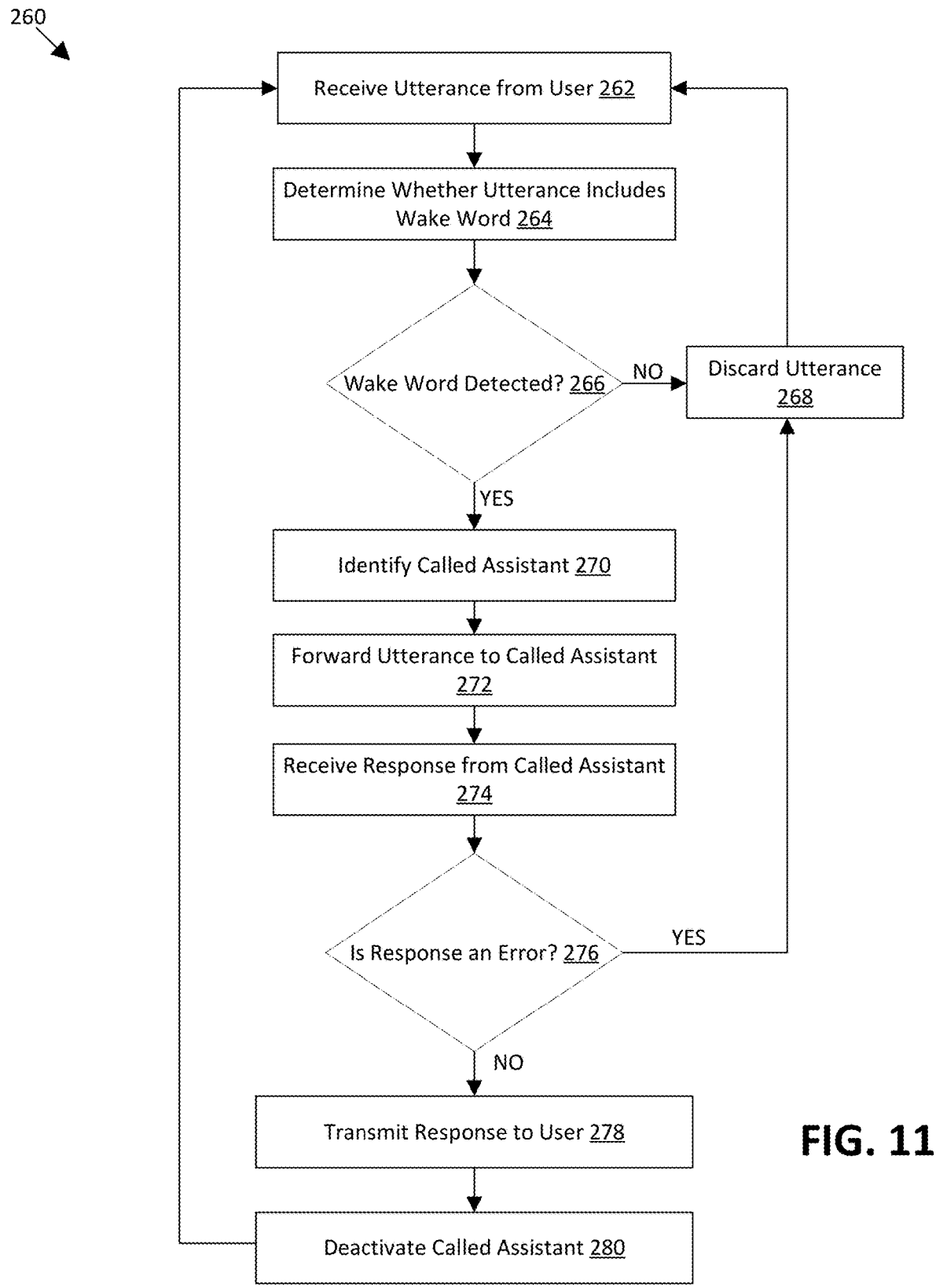
FIG. 11 is flowchart of an example method performable by a voice assistant manager.

FIG. 11 is flowchart of an example method 260. In some examples, the method 260 may be performed by the voice assistant manager 104 in response to an utterance from a user being detected by the device 102.

The method 260 may begin at operation 262. At operation 262, the voice assistant manager 104 may receive an utterance from a user. In some embodiments, the voice assistant manager 104 may use components (e.g., a speaker) of the device 102 to actively listen for utterances. Among other things, the voice assistant manager 104 may adjust a sensitivity or other parameter to account for ambient noise or other conditions. In some embodiments, the voice assistant manager 104 may determine that there is an utterance in response to detecting a change in a baseline noise. Furthermore, in some embodiment, the voice assistant manager 104 may receive multiple utterances. For example, the voice assistant manager 104 may first receive an utterance containing just a wake word and then an utterance with a request. In some embodiments, the voice assistant manager 104 may combine multiple utterances into one utterance for downstream processing. As part of receiving an utterance, the voice assistant manager 104 may perform one or more natural language processing tasks related to receiving and processing voice input. For example, the voice assistant manager 104 may parse the utterance (e.g., an audio stream) into text. As another example, the voice assistant manager 104 may determine when the utterance starts and stops, and separate the sounds of the audio stream into words.

At operation 264, the voice assistant manager 104 may determine whether there is a wake word present in the utterance. To do so, the voice assistant manager 104 may, in some embodiments, apply the wake word detection model 180 to the utterance, or to a part of the utterance. As described above, the wake word detection model 180 may be trained to recognize a plurality of wake words in speech. In some examples, the wake word detection model 180 may output a likelihood that one of the wake words is present.

In some embodiments, a user or administrator of the voice assistant manager 104 may define a threshold value for determining whether a wake word is present. If the likelihood output by the wake word detection model is above that threshold value, then the voice assistant manager 104 may determine that a wake word is present. In some embodiments, because the wake word may later be verified by a voice assistant, the threshold value may be lower than it would be if the voice assistant manager 104 was the only entity determining whether an assistant is called. As a result of having a lower threshold value, the voice assistant manager 104 may be more sensitive when detecting wake words. For example, the voice assistant manager 104 may be less likely to incorrectly determine that a wake word is not present, thereby reducing false negatives. Furthermore, the voice assistant manager 104 may deploy a smaller model, a model that requires less data, or a model that trains and infers faster.

At decision 266, the voice assistant manager 104 may determine whether a wake word was detected. In response to determining that a wake word was not detected, the voice assistant manager 104 may proceed to operation 268 (e.g., taking the "NO" branch). In response to determining that a wake word was detected, the voice assistant manager 104 may proceed to the operation 270 (e.g., taking the "YES" branch).

At operation 268, the voice assistant manager 104 may discard an utterance. For example, the utterance may not have been directed at the device 102 or any of the voice assistants 106*a-x* (e.g., the utterance may not have included a wake word, because the utterance may have been from a television, a speaker, or a conversation not directed to the device 102 or any of the voice assistants 106*a-x*). As part of discarding the utterance, the voice assistant manager 104 may erase any data related to having received the utterance. Furthermore, after discarding the utterance, the voice assistant manager 104 may return to listening for another utterance.

At operation 270, the voice assistant manager 104 may identify a called assistant. As part of identifying the called assistant, the voice assistant manager 104 may, in some embodiments, determine which assistant is associated with the detected wake word and activate that assistant. An example of identifying a called assistant is further described below in connection with FIG. 12.

At operation 272, the voice assistant manager 104 may communicate the utterance to the called assistant, which may have been identified by the voice assistant manager 104 at operation 270. In addition to the utterance, the voice assistant manager 104 may also, in some embodiments, transmit other data to the called assistance, such as data related to the user who sent the utterance, the wake word detected, or other data. In some embodiments, the voice assistant manager 104 may send multiple utterances to the called assistant. For example, the voice assistant manager 104 may receive two utterances from a user. The first utterance may contain the wake word, and the second utterance may contain the request. In some embodiments, the voice assistant manager 104 may detect the wake word in the first utterance, identify the called assistant, and send the first utterance to the called assistant. Then when the voice assistant manager 104 receives the second utterance, the voice assistant manager 104 may, in some embodiments, determine that the second utterance is intended for the voice assistant called with the wake word of the first utterance. In some embodiments, the voice assistant manager 104 may then transmit the second utterance to the called assistant.

In some embodiments, the voice assistant manager 104 may encrypt the utterance but not encrypt the wake word. In some embodiments, the voice assistant manager 104 (or another aspect of the present disclosure) may use public-key cryptography to encrypt the utterance. In such an embodiment, the voice assistant manager 104 may transmit two audio files to the called assistant: an unencrypted file with the wake word and an encrypted file including the rest of the utterance. Furthermore, the voice assistant manager 104 may send a decryption key to the called assistant in response to detecting (e.g., by receiving a communication from the called assistant) that the called assistant successfully verified the wake word. As described below, the called assistant may receive the decryption key. In some embodiments, the called assistant may use the decryption key to decrypt the encrypted audio file. In some embodiments, the called assistant may send the decryption key to a cloud service.

At operation 274, the voice assistant manager 104 may receive a response from the called assistant. As is further described below in connection with FIG. 12, the called voice assistant may perform one or more operations in response to receiving the utterance and, in doing so, the called voice assistant may generate data that may be sent as a response to the voice assistant manager 104.

At decision 276, the voice assistant manager 104 may determine whether the response received from the called assistant at operation 276 includes an error. For example, the response from the called assistant may indicate that the called assistant or a cloud service associated with the called assistant could not verify the wake word. In response to determining that the response includes an error, the voice assistant manager 104 may proceed to operation 268 (e.g., taking the "NO" branch). In response to determining that the response does not include an error, the voice assistant manager 104 may proceed to operation 278 (e.g., taking the "YES" branch).

At operation 278, the voice assistant manager 104 may transmit a response to a user. For example, the response received from the called assistant may include data that is to be transmitted to the user that sent the utterance. In some embodiments, the called voice assistant may send that data to the voice assistant manager 104 as a response, and the voice assistant manager 104 may transmit the data to the user. Furthermore, in some embodiments, the voice assistant manager 104 may alter or add to the response before sending it to the user (e.g., the voice assistant manager 104 may add to the response to ask whether the user would like to send another request, or whether the user would like to send a request to a different voice assistant).

At operation 280, the voice assistant manager 104 may deactivate the called assistant. For example, the voice assistant manager 104 may determine that the called voice assistant has finished processing an utterance. For example, the response received from the called voice assistant at operation 274 may indicate that the called voice assistant has finished processing an utterance. As another example, the voice assistant manager 104 may query the called assistant to determine whether the called assistant has finished processing the utterance. In some embodiments, in response to determining that the called voice assistant finished processing the utterance, the voice assistant manager 104 may deactivate the called assistant. For example, the voice assistant manager 104 may send deactivation instructions to the called assistant. In some embodiments, the voice assistant manager 104 may keep the called assistant active in case the user wants to query the called assistant again; however, the voice assistant manager 104 may deactivate the called assistant in response to receiving an indication from a user that the user has finished interacting with the called assistant.

By deactivating the called voice assistant, the voice assistant manager 104 may conserve computer resources (e.g., memory and processing power), so that those computer resources can be used to perform another task or to activate another assistant. Additionally, even though the voice assistant manager 104 may deactivate the called assistant, the voice assistant manager 104 itself may remain active and listening for another utterance. As a result, a user may not be affected by the deactivation of the called assistant, because the called assistant will still be available to the user. For example, the user could still direct another request to the called voice assistant, and the request will still be detected by the voice assistant manager 104 and, in response to detecting an appropriate wake word, communicated to the called assistant.

Figure 12:
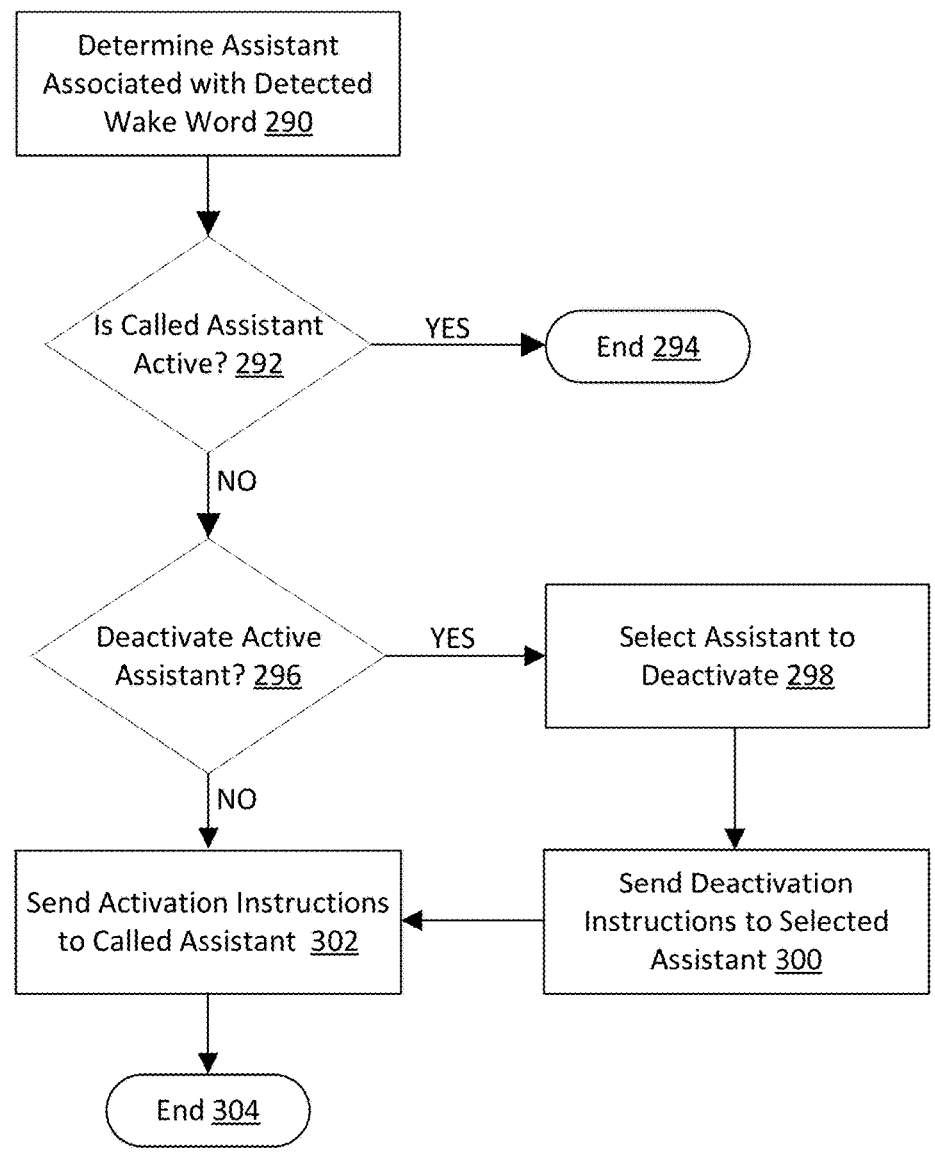
FIG. 12 is a flowchart of an example method for identifying a called assistant.

FIG. 12 is a flowchart of an example method for performing at least part of identifying a called assistant, an operation that is described above as operation 270 in FIG. 11. In some embodiments, the method depicted in FIG. 12 may be performed by the voice assistant manager 104. In some embodiments, aspects of the method of FIG. 12 may be performed after performing operation 270 of FIG. 6, rather than as part of performing operation 270.

At operation 290, the voice assistant manager 104 may determine an assistant associated with the detected wake word. For example, the voice assistant manager 104 may determine which voice assistant of the voice assistants 106*a-x* is associated with the wake word that was detected in the utterance (e.g., the wake word detected at operation 264 of FIG. 11). To do so, the voice assistant manager 104 may, in some examples, use the wake word mapping data 110 of FIG. 1 or another data set that links wake words with voice assistants. In some examples, the voice assistant that is associated with the detected wake word is the called assistant, as that is the assistant that the user called to process the request.

At decision 292, the voice assistant manager 104 may determine whether the called assistant is active. In some embodiments, the voice assistant manager 104 may keep track of which voice assistants of the voice assistants 106*a-x* are active (e.g., using the assistant status controller 182 or the assistant data 188). In other embodiments, the voice assistant manager 104 may send a communication to the called assistant or ping the called assistant to determine whether it is active. In response to determining that the called assistant is active, the voice assistant manager 104 may end the method, thereby returning to other aspects of the method 260 (e.g., taking the "YES" branch). In response to determining that the called assistant is deactivated, the voice assistant manager 104 may proceed to the decision 296 (e.g., taking the "NO" branch). In some embodiments, when a voice assistant is active, it may be loaded into memory and be listening for an utterance or otherwise be ready to receive an utterance. Additionally, in some embodiments, when deactivated, the voice assistant may not be loaded into memory, may not be listening, or may not be able to receive a request. Therefore, in some embodiments, if the called assistant is not active, then it may have to be activated before the voice assistant manager 104 may communicate the utterance to it.

At decision 296, the voice assistant manager 104 may determine whether an active assistant needs to be deactivated. In some embodiments, only one voice assistant of the voice assistants 106*a-x* may be active at a time. In other embodiments, more than one voice assistant of the voice assistants 106*a-x* may be active at a time, but there may be a limit. In some embodiments, a limit of active voice assistants may be defined by a user or by an administrator of the device 102. In some embodiments, a limit of active voice assistants may be based at least in part on a determination of available computer resources of the device 102. In some embodiments, if the device 102 is battery operated and if the remaining battery life is below a certain amount (e.g., the battery is at or below 50% or 25%), then it may be determined that fewer voice assistants may be active. Therefore, in certain embodiments, the voice assistant manager 104 may have to deactivate an active voice assistant to activate the called assistant. In response to determining that an active assistant must be deactivated, the voice assistant manager 104 may proceed to operation 298 (e.g., taking the "YES" branch). In response to determining that an active assistant does not need to be deactivated (e.g., because there are no active assistants or because the called assistant may be activated without deactivating another assistant), then the voice assistant manager 104 may proceed to the operation 302 (e.g., taking the "NO" branch to operation 302).

At operation 298, the voice assistant manager 104 may select an active assistant to deactivate. For example, if there is only one active assistant, then the voice assistant manager 104 may select that assistant. However, if there are more than one active assistants, then the voice assistant manager 104 may have to select which of the active assistants to deactivate. In some embodiments, the voice assistant manager 104 may deactivate all active voice assistants. In other embodiments, however, the voice assistant manager 104 may select one or more of the active assistants to deactivate. To do so, the voice assistant manager 104 may, in some embodiments, select the assistant of the active assistants that has least frequently been used (e.g., based on historic usage data). In other embodiments, the voice assistant manager 104 may select the assistant of the active assistants based on a recency of use (e.g., selecting an assistant to deactivate that has not been recently used). In yet other embodiments, the voice assistant manager 104 may select an assistant to deactivate based on other criteria, such as a user preference, a time of day, or a popularity at a time of day.

At operation 300, the voice assistant manager 104 may send deactivation instructions to the selected active assistant (e.g., the assistant selected at operation 298). In response to receiving the deactivation instructions, the one or more selected assistants may deactivate.

At operation 302, the voice assistant manager 104 may send activation instructions to the called assistant. The called assistant may then be able to receive an utterance. Having identified and activated the called assistant, the voice assistant manager 104 may exit the method illustrated in FIG. 12, thereby returning to the method 260.

Figure 13:
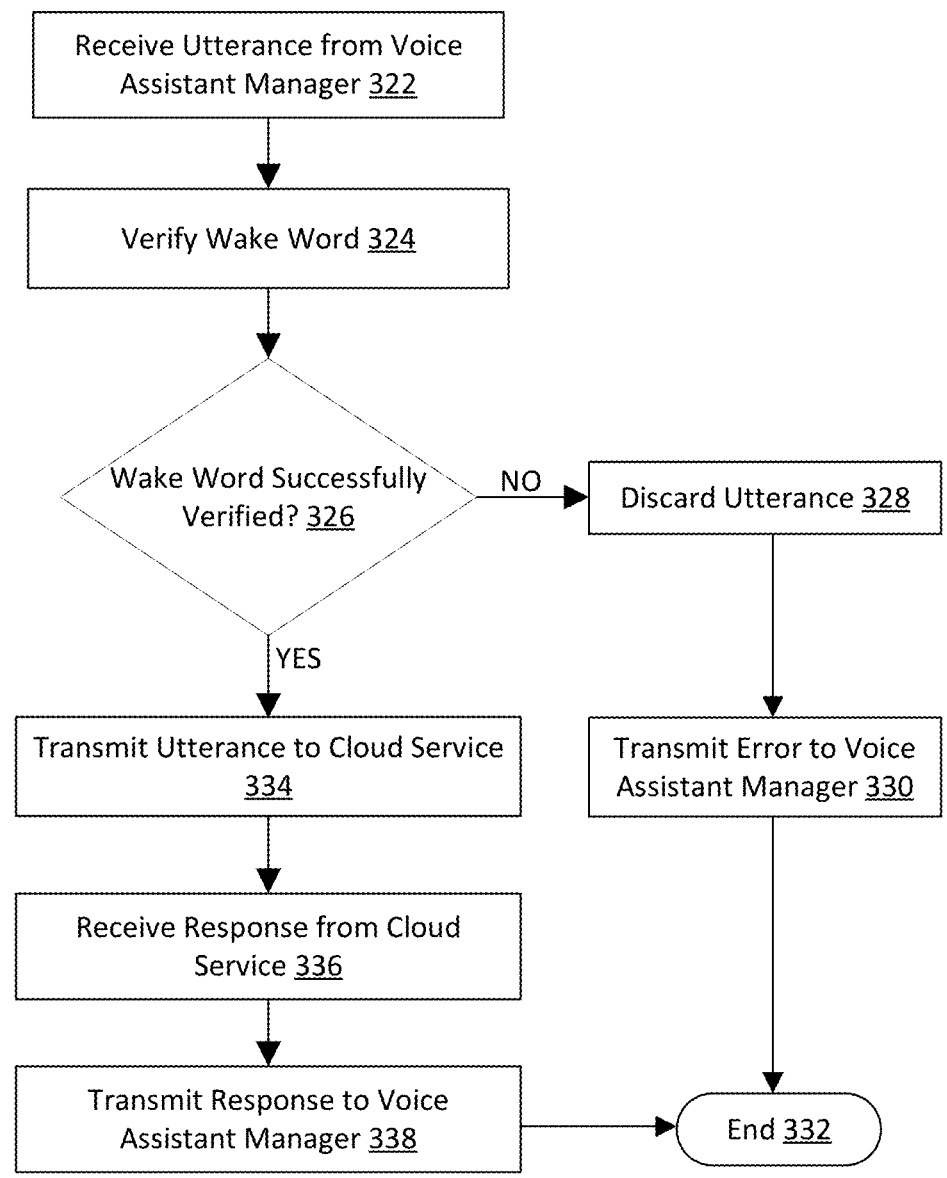
FIG. 13 is a flowchart of an example method performable by a voice assistant.

FIG. 13 is a flowchart of an example method 320. In some embodiments, the method 320 may be performed by a voice assistant of the voice assistants 106*a-x*. In some embodiments, the method 320 may be performed by a called assistant (e.g., an assistant associated with a wake word detected in an utterance by the voice assistant manager 104, as described above in connection with FIGS. 11-12). In some examples, the called assistant performing the method 320 may be active.

At operation 322, the called assistant may receive an utterance from the voice assistant manager 104. For example, referring to the example of FIG. 1, the called assistant (e.g., the voice assistant 106*b*) may receive the utterance, "Iris, play my favorite song" from the voice assistant manager 104. In some embodiments, the called assistant may receive the utterance as altered by the voice assistant manager 104 (e.g., the voice assistant manager 104 may have standardized or otherwise altered the utterance as part of performing natural language processing tasks related to receiving and processing speech). Additionally, in some embodiments, the called assistant may receive other data from the voice assistant manager 104 (e.g., data regarding the context in which the utterance was received or data about the user that sent the utterance). In some embodiments, the called assistant may receive two audio files from the voice assistant manager 104. One audio file may be unencrypted and include the wake word. The other audio file may be encrypted and include aspects of the utterance. In response to successfully verifying that the unencrypted wake word is, in fact, associated with the called assistant, the called assistant may, in some embodiments, request and receive a decryption key from the voice assistant manager 104.

At operation 324, the called assistant may verify the wake word in the utterance. For example, as described above, the called assistant may apply an assistant wake word detection model 200 to the utterance. In some embodiments, this assistant-specific wake word detection model may determine whether the utterance includes a wake word that is associated with the called assistant. In some embodiments, the assistant wake word detection model 200 will output a likelihood that a wake word is present. If the likelihood is greater than a threshold value (e.g., a value defined by a user or learned by the called assistant), then the called assistant may determine that the wake word is present.

By verifying the wake word at the called assistant, the frequency of false positives may decrease in some embodiments. Furthermore, the likelihood of false negatives may also decrease in some embodiments, because the voice assistant manager 104 may be configured to be more sensitive when detecting wake words (e.g., more likely to determine that a wake word is present in an utterance). Furthermore, in some embodiments, because the called assistant and voice assistant manager 104 may be on the same device, the likelihood of false positives and false negatives may be decreased without needing to send the utterance to an entity or service that is not on the device. Yet still, because the wake word detection processes at both the voice assistant manager 104 and called assistant may be configured or altered (e.g., an administrator or engineer may alter models at the voice assistant manager 104 and at the called assistant), the way in which the voice assistant manager 104 and the voice assistants 106*a-x* are implemented may be flexible. For instance, in some embodiments, the voice assistant manager 104 may be smaller (e.g., requiring less memory and processing time to operate, or having a model that is faster to train or that requires less training data) than at least some of the voice assistants. In other embodiments, the voice assistant manager 104 may be larger (e.g., requiring more memory and processing time to operate, or having a model that is slower to train or that requires more training data) than some of the voice assistants, thereby allowing the voice assistants to be smaller or faster. In either case, false positives and false negatives may be decreased, and the implementation of the voice assistant manager 104 and voice assistants 106*a-x* may be customized depending on the use case.

At decision 326, if the called assistant fails to verify the wake word, then the called assistant may proceed to operation 328 (e.g., taking the "NO" branch). On the other hand, in response to determining that the wake word is in the utterance (e.g., if the assistant wake word detection model is sufficiently confident that the wake word is present), then the called assistant may proceed to operation 334 (e.g., taking the "YES" branch).

At operation 328, the called assistant may discard the utterance. As part of discarding the utterance, the called assistant may delete any data related to the utterance. At operation 330, the called assistant may transmit an error to the voice assistant manager 104. In some examples, the error may indicate that the called assistant failed to verify the wake word. At operation 332, the called assistant may end the method 320. In some examples, once the called assistant has ended the method 320, the voice assistant manager 104 may deactivate the called assistant.

At operation 334, the called assistant may transmit an utterance to a cloud service. In some embodiments, the called assistant may not process the utterance on the device 102. In such embodiments, the called assistant may send the utterance to an associated cloud service for processing. For example, the called assistant may open a socket and perform other operations to send the utterance to the cloud service.

In some embodiments, the called assistant may send two audio files to the cloud service. One audio file may be unencrypted and may include the wake word. The other audio file may be encrypted and include the utterance, or aspects of the utterance. Furthermore, in response to determining that the cloud service successfully verified the wake word, the called assistant may send a decryption key to the cloud service for decrypting the encrypted audio file. In some embodiments, however, the called assistant may process the utterance without sending it to a cloud service. For example, the called assistant may determine that it is capable of performing a request locally. For example, the request may relate to storing or retrieving data, and the called assistant may be able to store or retrieve the data locally. As another example, the called assistant may include a cache that allows the called assistant to perform the request.

At operation 336, the called assistant may receive a response from the cloud service. For example, the cloud service may have generated data responsive to the utterance, and the cloud service may have sent that data to the called assistant, as is further described below in connection with FIG. 14.

At operation 338, the called assistant may transmit the response to the voice assistant manager 104, which may then transmit the response to the user. In some embodiments, however, the called assistant may transmit a response directly to the user, without first sending the data to the voice assistant manager 104.

Figure 14:
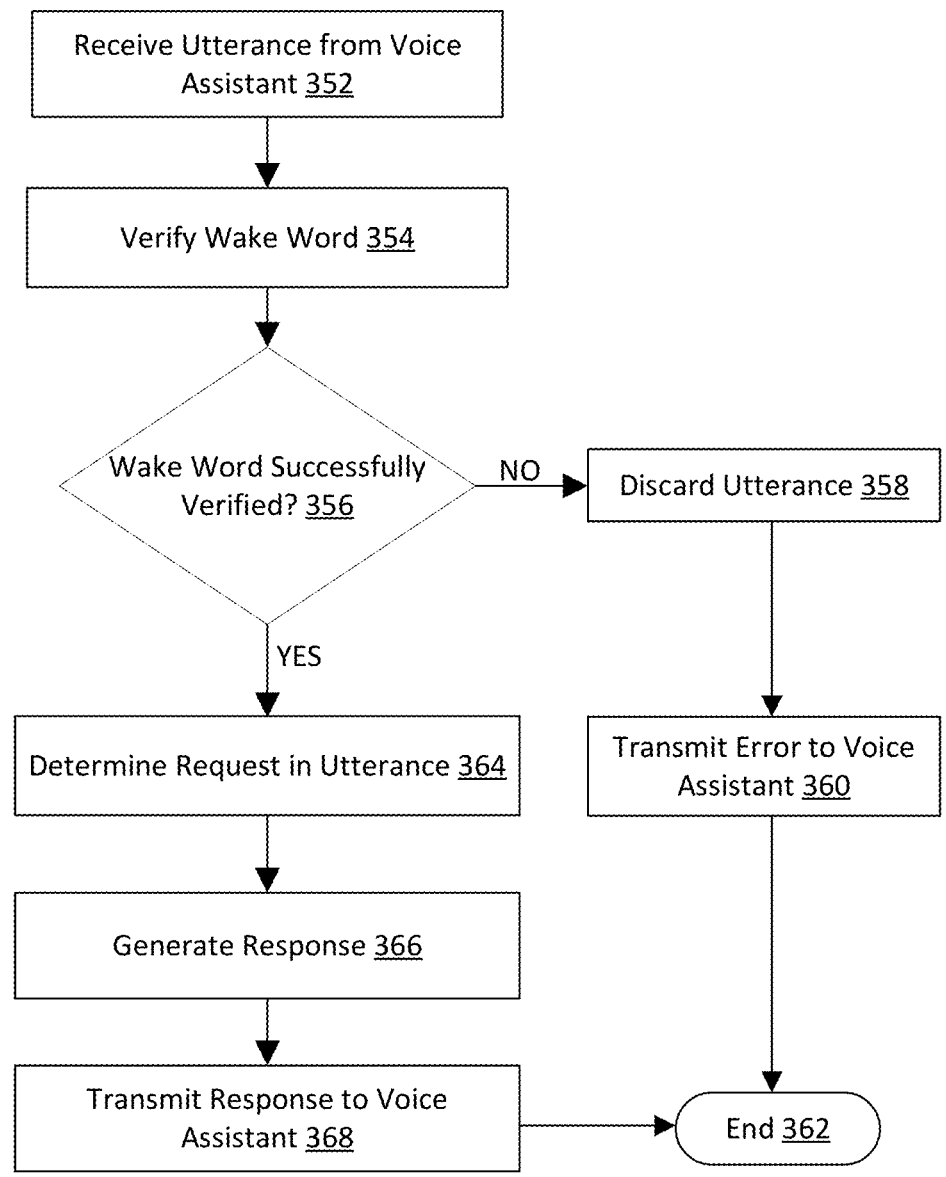
FIG. 14 is a flowchart of an example method performable by a cloud service.

FIG. 14 is a flowchart of an example method 350 performable by a cloud service of the plurality of cloud services 224*a-x*. For example, the method 350 may be performed by a cloud service that is associated with the called voice assistant of the voice assistants 106*a-x* (e.g., as described above in connection with FIGS. 11-13). As described above, the cloud service that is associated with the called assistant may be related, in some embodiments, to the same company, product, or service as the called assistant.

At operation 352, the cloud service may receive an utterance from the called assistant. For example, referring to the example of FIG. 1, the cloud service may receive the utterance, "Iris, play my favorite song." In some embodiments, the cloud service may also receive other data from the called assistant or from the device that the called assistant is on (e.g., data regarding the context in which the utterance was received or data about the user that sent the utterance). In some embodiments, the cloud service may receive a plurality of audio files. For example, the cloud service may receive an unencrypted audio file that include the wake word, and the cloud service may receive an encrypted audio file that includes the rest of the utterance (e.g., a request and parameters of the utterance). In such embodiments, the cloud service may require a decryption key before beginning to process the encrypted audio file.

At operation 354, the cloud service may verify the wake word in the utterance. For example, as described above, the cloud service may apply a cloud wake word detection model 240 to the utterance. In some embodiments, the cloud wake word detection model 240 may determine whether a wake word associated with the called assistant or with the cloud service is present in the utterance. In some embodiments, the cloud wake word detection model 240 will output a likelihood that a wake word is present. If the likelihood is greater than a threshold value (e.g., a value defined by a user or learned by the cloud service), then the cloud service may determine that the wake word is present. By verifying the wake word at the cloud service, the likelihood of false positives is further decreased. Furthermore, by verifying the wake word at the cloud service the likelihood of false negatives is decreased, because one or more of the voice assistant manager 104 or the called assistant may be configured to be more sensitive when detecting wake words.

At decision 356, if the cloud service fails to verify the wake word, then the cloud service may proceed to operation 358 (e.g., taking the "NO" branch). On the other hand, in response to determining that the wake word is in the utterance (e.g., if the cloud wake word detection model is sufficiently confident that the wake word is present), then the cloud service may proceed to operation 364 (e.g., taking the "YES" branch).

At operation 358, the cloud service may discard the utterance. As part of discarding the utterance, the cloud service may delete any data related to the utterance. Such data may include any one or more of the following: a compressed or uncompressed digital audio file of the utterance, data related to the user who sent the utterance (e.g., user profile or identity data), data related to the device 102 (e.g., the device type, device operating system, IMEI number, or other device data), time data related to the utterance (e.g., when the utterance was sent, received, or processed), or location information (e.g., of the device 102 or the user). Furthermore, in some embodiments (e.g., if the cloud service receives a plurality of audio files), then the cloud service may also delete all audio files associated with the wake word, and the cloud service may not receive a key to decrypt any files that were encrypted.

At operation 360, the cloud service may transmit an error to the called assistant. In some instances, the error may indicate that the cloud service failed to verify the wake word. In other instances, the error may indicate that the cloud service is unable to process the utterance (e.g., because the cloud service is unable to fulfill a request of the utterance). At operation 362, the cloud service may end the method 350 (e.g., a socket coupling the cloud service with the device 102 may be closed).

At operation 364, the cloud service may determine a request of the utterance. In some embodiments, the cloud service may need to decrypt the utterance prior to processing it (e.g., in the embodiment in which the cloud service may receive a plurality of audio files, one of which is an unencrypted wake word and another of which is an encrypted file of the utterance). Thus, the cloud service may, in response to verifying the wake word, receive a decryption key from the called assistant and then use that decryption key to decrypt the encrypted utterance. Having decrypted the utterance, the cloud service may proceed to determine a request of the utterance and fulfill the request. Thus, the cloud service may only access the utterance if a wake word is successfully verified, thereby lowering, in some embodiments, a likelihood that the cloud service receives unencrypted data that was not intended to be sent to the cloud service, a feature that may strengthen user privacy and user control over which entities receive the user's utterances and other data.

For embodiments in which the utterance is not encrypted, the cloud service may process the utterance (e.g., by first determining a request of the utterance) at the same time as the cloud service verifies the wake word. In such embodiments, the cloud service may leverage parallel computing to perform aspects of the method 350 more quickly. In such embodiments, if the cloud service fails to verify the wake word, then the cloud service may stop processing the request and discard any data related to processing the request.

As described above in connection with FIG. 1, an utterance may include a wake word and a request, and the request may include an action and, in some instances, one or more parameters. The cloud service may, in some embodiments, determine the action and, in some instances, parameters of a request of an utterance. In some embodiments, the cloud service may determine a plurality of actions as part of determining a request of an utterance. To determine a request of an utterance, the cloud service may apply one or more natural language processing models or other computer-implemented systems for understanding or classifying language. In some examples, if the cloud service is unable to determine a request in the utterance, the cloud service may return an error.

At operation 366, the cloud service may generate a response to the request. For example, the cloud service may take one or more actions in response to determining the request of the utterance. The actions may be conducted by the cloud service itself or by a third party outside of the cloud service if the requested service is not associated with the cloud service. For instance, if the request asks the voice assistant to play media content from a specific streaming service, as identified from the utterance, then the cloud service may determine where the media content is stored and generate an audio streaming request of media content and establish the data transmission of the media content. As another example, if the request asks the voice assistant to check a bank account balance, then the cloud service may contact the bank to determine a bank account balance and generate a response that reports the balance. As another example, if the request asks the cloud service to schedule an appointment, then cloud service may contact a third party to schedule the appointment, or the cloud service may generate a response to the user that asks for more information, such as the identity of the entity to schedule the appointment with. In a similar manner, the cloud service may generate a response to requests from a user that the cloud service and its associated voice assistant are capable of handling.

At operation 368, the cloud service may transmit the response generated at operation 366 to the called voice assistant. Example responses include, but are not limited to, the following: one or more results for a query; a confirmation that a task was completed; data that can be output by the device 102 in a text-to-speech (TTS) process; or other information related to fulfilling or responding an utterance. As described above, the called assistant may then transmit the response to the user or to the voice assistant manager 104. Having transmitted the response to the called assistant, the cloud service may end the method 350.

Figure 15:
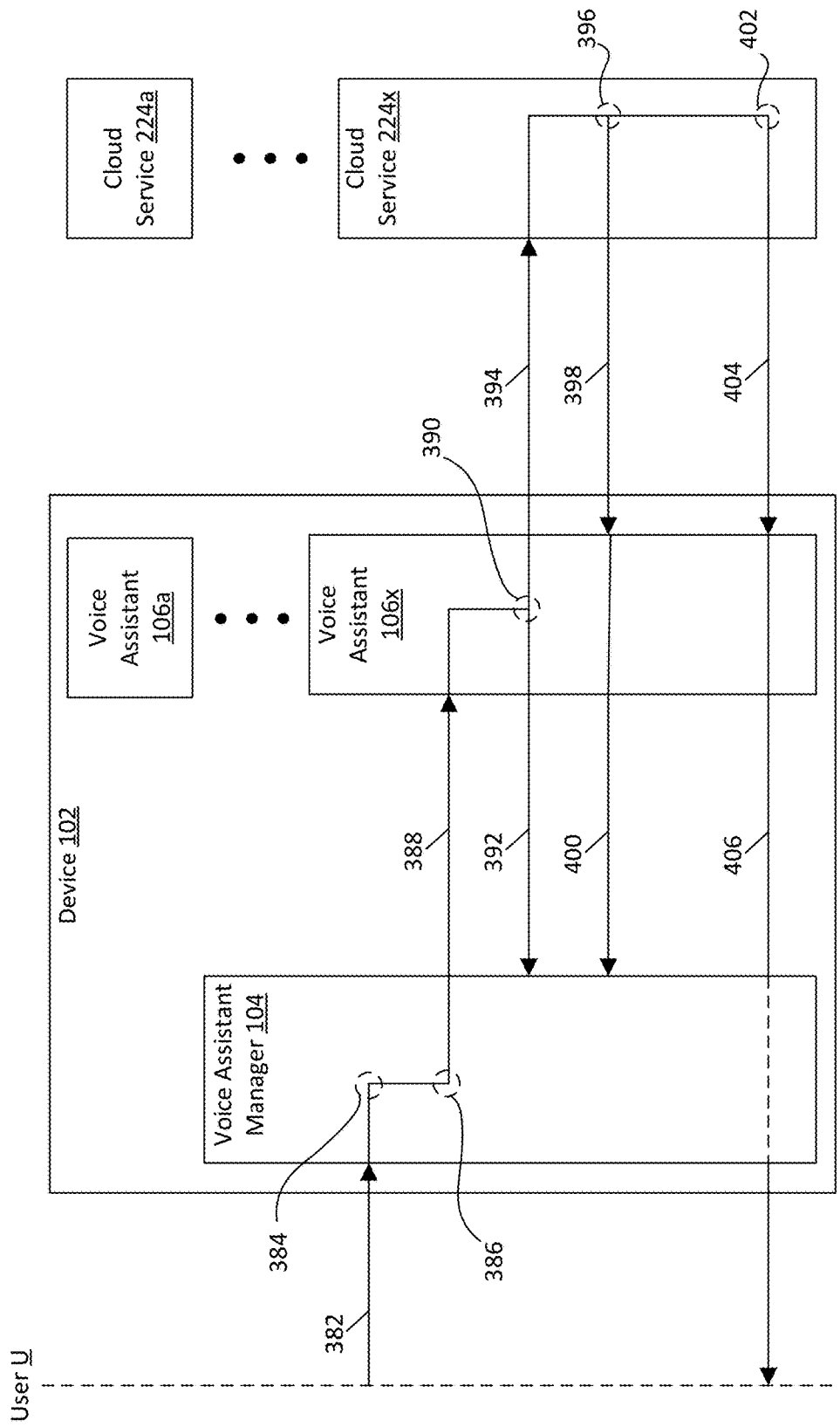
FIG. 15 illustrates a communication diagram of interactions between components of an example system for processing voice requests.

FIG. 15 illustrates a communication diagram of interactions between components of an example system 380 for processing voice requests. The example system 380 includes a user U, device 102, and a plurality of cloud services 224a-x. As described above, the device 102 may include a voice assistant manager 104 and a plurality of voice assistants 106a-x. In some embodiments, the method depicted in FIG. 15 may be used to perform aspects of the operations described above in connection with FIGS. 11-14.

At operation 382, the user U may send an utterance to the voice assistant manager 104. At operation 384, the voice assistant manager 104 may determine whether the utterance includes a wake word. In response to detecting a wake word in the utterance, the voice assistant manager 104 may proceed to operation 386. At operation 386, the voice assistant manager 104 may identify a called assistant that is associated with the detected wake word. In the example of FIG. 15, the called voice assistant is the voice assistant 106x. As described above in connection with FIG. 12, the voice assistant manager 104 may also activate the voice assistants 106x and may deactivate another voice assistant of the voice assistants 106a-x. At the operation 388, the voice assistant manager 104 may transmit the utterance, and, in some example, other data, to the voice assistant 106x.

At operation 388, the voice assistant 106 may receive the utterance. At operation 390, the voice assistant 106x may verify that the utterance includes the wake word. In response to failing to verify the wake word (e.g., determining that the utterance does not include a wake word associated with the voice assistant 106x), the voice assistant 106x may, at operation 392, transmit an error to the voice assistant manager. In response to successfully verifying the wake word (e.g., determining that the utterance does include a wake word associated with the voice assistant 106x), the voice assistant 106x may, at operation 394, transmit the utterance to the cloud service 224x.

At operation 394, the cloud service 224x, which may be associated with the voice assistant 106x, receives the utterance. At operation 396, the cloud service 224x verifies that the utterance includes the wake word. In response to failing to verify the wake word (e.g., determining that the utterance does not include a wake word associated with the voice assistant 106x), the cloud service 224x may, at operation 398, transmit an error to the voice assistant 106x. The voice assistant 106x may receive the error and, at operation 400 transmit the error to the voice assistant manager 104. In response to successfully verifying the wake word (e.g., determining that the utterance does include a wake word associated with the voice assistant 106x), the cloud service 224x may proceed to operation 402.

At operation 402, the cloud service 224x may process the utterance. For example, the cloud service 224x may determine a request of the utterance and generate a response to the request. At operation 404, the cloud service 224x may transmit the response to the voice assistant 106x, and the voice assistant 106x may receive the response. At operation 406, the voice assistant 106x may transmit the response to the voice assistant manager 104, which may then transmit the response to the user U. In other embodiments, the voice assistant 106x may, at operation 406, transmit the response directly to the user U, as indicated by the dashed line through the voice assistant manager 104.

Figure 16:
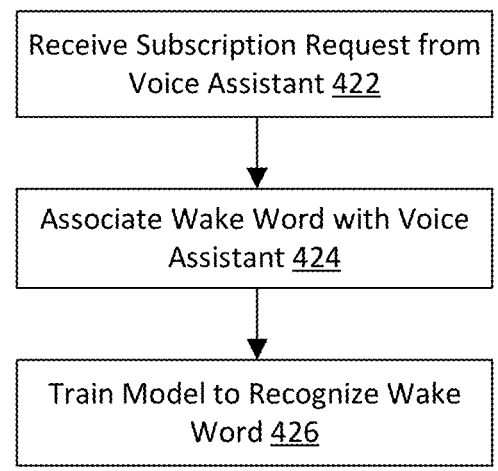
FIG. 16 is a flowchart of an example method for subscribing a voice assistant.

FIG. 16 is a flowchart of an example method 420 for subscribing a voice assistant. In some examples, the method 420 may be performed by the voice assistant manager 104. As described above, the plurality of voice assistants 106a-x may be altered as assistants are removed or as assistants are added. In some embodiments, a voice assistant may be added by subscribing with the voice assistant manager 104. Furthermore, in some embodiments, a voice assistant may be installed on the device 102 prior to subscribing with the voice assistant manager 104. In some examples, a voice assistant may be downloaded (e.g., from an App Store) and once downloaded (or as part of the downloading and installation process), the voice assistant may subscribe with the voice assistant manager 104. In some embodiments, the voice assistant manager 104 may expose an API that a voice assistant may call to subscribe with the voice assistant manager 104. In some embodiments, the method 420 may begin when a voice assistant subscribes with the voice assistant manager 104.

At operation 422, the voice assistant manager 104 may receive a subscription request from a voice assistant. The subscription request may include information about the subscribing voice assistant. For example, the subscription request may include one or more wake words that are associated with the subscribing assistant. Furthermore, the subscription request may include information related to actions that the subscribing voice assistant may perform, or information related to categories or topics that the subscribing assistant is related to. Additionally, the subscription request may include information related to how much memory the subscribing assistant requires to operate. In some embodiments, the subscription request may indicate whether the subscribing assistant is configured to communicate via a Matter network and, if so, the subscription request may also include data related to communicating with the subscribing assistant via the Matter network. Furthermore, the subscription request may include other data that the voice assistant manager 104 may need to interact with or manage the subscribing assistant, and other data that is related to the subscribing assistant.

At operation 424, the voice assistant manager 104 may associate wake words with the subscribing assistant. For example, the voice assistant manager 104 may associate the one or more wake words (or wake phrases) of the subscription request received at operation 422 with the subscribing assistant. In some embodiments, the voice assistant manager 104 may alter or add to data that links wake words with voice assistants. For example, the voice assistant manager 104 may add one or more rows to the wake word mapping data 110, with each added row including one of the wake words of the subscription request and the subscribing voice assistant.

At operation 426, the voice assistant manager 104 may train the wake word detection model 180 to detect the one or more wake words of the subscription request. To do so, the voice assistant manager 104 may, in some embodiments, generate training data, some of which may include utterances that have one of the wake words associated with the subscribing assistant. In some embodiments, at least some of the training data may be included in the subscription request.

In some embodiments, once the voice assistant manager 104 completes the method 420, the subscribing agent is then added to the plurality of voice assistants 106a-x. Therefore, the voice assistant manager 104 may identify that the subscribing assistant is the called assistant in response to detecting a wake word that is associated with the subscribing assistant, a process that is described above in connection with FIGS. 11-14.

Figure 17:
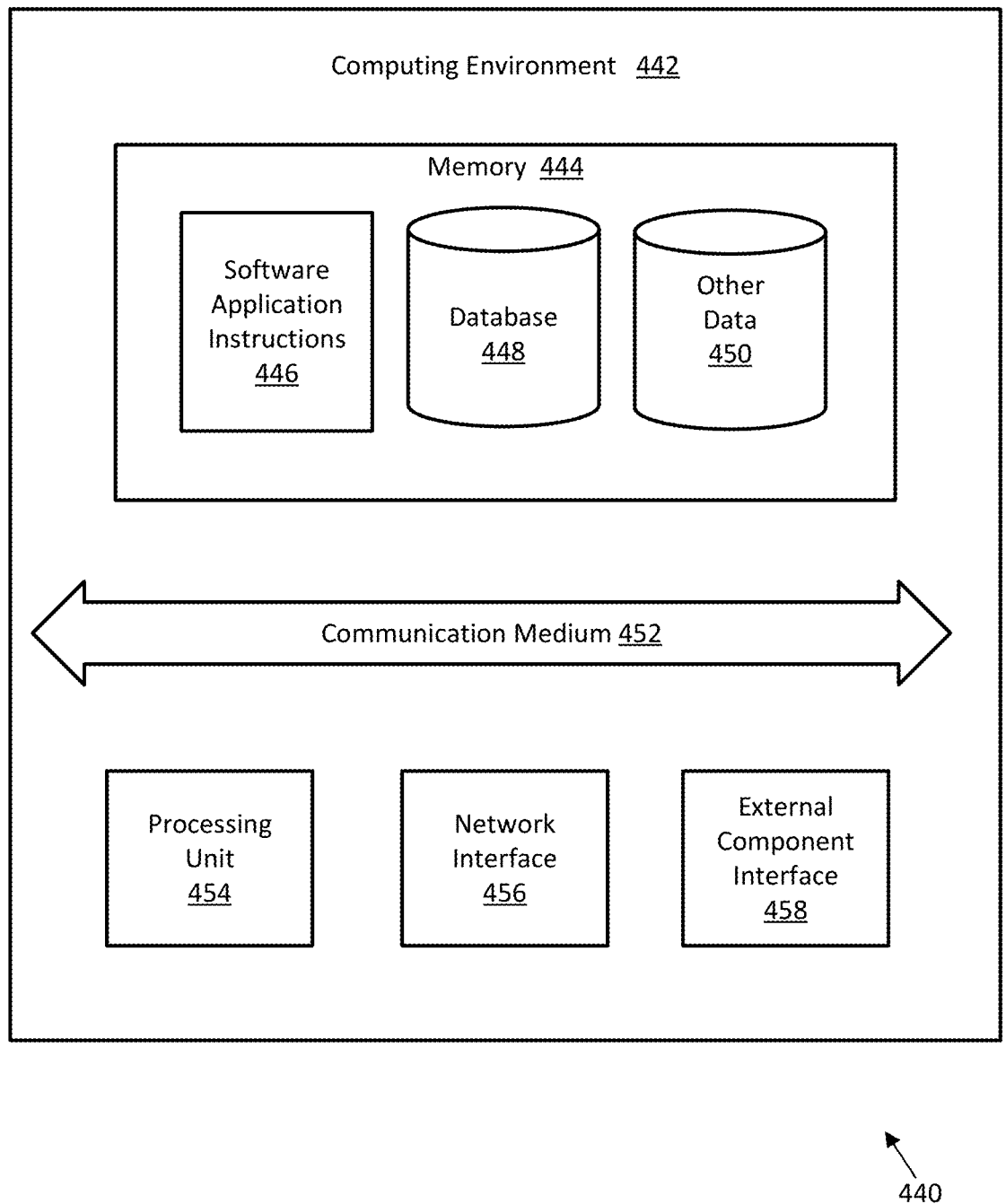
FIG. 17 illustrates a block diagram of an example computing system.

FIG. 17 illustrates an example system 440 with which disclosed systems and methods can be used. In an example, the following can be implemented in one or more systems 440 or in one or more systems having one or more components of system 440: the device 102, the voice assistant manager 104, the plurality of voice assistants 106a-x, the wake word mapping data 110, the device 130, the wake word detection model 180, the assistant status controller 182, the routing handler 184, the assistant subscription service 186, the assistant data 188, the assistant wake word detection model 200, the cloud service interface 202, the request processor 204, the data store 206, the network 222, the cloud services 224a-x, the cloud wake word detection model 240, the request processor 242, the data store 244, and other aspects of the present disclosure.

In an example, the system 440 can include a computing environment 442. The computing environment 442 can be a physical computing environment, a virtualized computing environment, or a combination thereof. The computing environment 442 can include memory 444, a communication medium 452, one or more processing units 454, a network interface 456, and an external component interface 458.

The memory 444 can include a computer readable storage medium. The computer storage medium can be a device or article of manufacture that stores data and/or computer-executable instructions. The memory 444 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices or articles of manufacture that store data.

The memory 444 can store various types of data and software. For example, as illustrated, the memory 444 includes software application instructions 446, one or more databases 448, as well as other data 450. The communication medium 452 can facilitate communication among the components of the computing environment 442. In an example, the communication medium 452 can facilitate communication among the memory 444, the one or more processing units 454, the network interface 456, and the external component interface 458. The communication medium 452 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 454 can include physical or virtual units that selectively execute software instructions, such as the software application instructions 446. In an example, the one or more processing units 454 can be physical products comprising one or more integrated circuits. The one or more processing units 454 can be implemented as one or more processing cores. In another example, one or more processing units 454 are implemented as one or more separate microprocessors. In yet another example embodiment, the one or more processing units 454 can include an application-specific integrated circuit (ASIC) that provides specific functionality. In yet another example, the one or more processing units 454 provide specific functionality by using an ASIC and by executing computer-executable instructions.

The network interface 456 enables the computing environment 442 to send and receive data from a communication network. The network interface 456 can be implemented as an Ethernet interface, a token-ring network interface, a fiber optic network interface, a wireless network interface (e.g., Wi-Fi), a Bluetooth interface, an interface for sending or receiving communications pursuant to the Matter protocol, or another type of network interface.

The external component interface 458 enables the computing environment 442 to communicate with external devices. For example, the external component interface 458 can be a USB interface, Thunderbolt interface, a Lightning interface, a serial port interface, a parallel port interface, a PS/2 interface, or another type of interface that enables the computing environment 442 to communicate with external devices. In various embodiments, the external component interface 458 enables the computing environment 442 to communicate with various external components, such as external storage devices, input devices, speakers, modems, media player docks, other computing devices, scanners, digital cameras, and fingerprint readers.

Although illustrated as being components of a single computing environment 442, the components of the computing environment 442 can be spread across multiple computing environments 442. For example, one or more of instructions or data stored on the memory 444 may be stored partially or entirely in a separate computing environment 442 that is accessed over a network.

While particular uses of the technology have been illustrated and discussed above, the disclosed technology can be used with a variety of data structures and processes in accordance with many examples of the technology. The above discussion is not meant to suggest that the disclosed technology is only suitable for implementation with the components and operations shown and described above.

This disclosure described some aspects of the present technology with reference to the accompanying drawings, in which only some of the possible aspects were shown. Other aspects can, however, be embodied in different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

The various embodiments described above are provided by way of illustration only and should not be construed to limit the claims attached hereto. Those skilled in the art will readily recognize various modifications and changes that may be made without following the example embodiments and applications illustrated and described herein, and without departing from the full scope of the following claims.

What is claimed is:

1. A system for processing voice requests, the system comprising:

a voice assistant manager;
a plurality of voice assistants;
a processor; and
memory coupled to the processor, wherein the memory stores instructions that, when executed by the processor, cause the voice assistant manager to:
   receive an utterance from a user,
   detect a wake word in the utterance using a first wake word detection model,
   based on the wake word, identify a called assistant from the plurality of voice assistants, and
   communicate the utterance to the called assistant,
wherein the instructions, when executed by the processor, cause the called assistant to:
   receive the utterance from the voice assistant manager; and verify the wake word in the received utterance using a second wake word detection model,
   wherein the second wake word detection model is trained to recognize one or more wake words,
   wherein verifying the wake word comprises inputting the utterance into the second wake word detection model, and
   wherein the system is further configured to generate a response to the utterance and transmit the response to the user.

2. The system of claim 1, wherein the instructions, when executed by the processor, further cause the voice assistant manager to:
   deactivate the called assistant; and
   listen for a second utterance.

3. The system of claim 1, wherein the instructions, when executed by the processor, further cause the voice assistant manager to:
   determine whether the called assistant is active; and
   in response to determining that the called assistant is not active, activate the called assistant before communicating the utterance to the called assistant.

4. The system of claim 3, wherein the instructions, when executed by the processor, further cause the voice assistant manager to, before activating the called assistant, deactivate a second assistant of the plurality of voice assistants.

5. The system of claim 1, wherein the called assistant is communicatively coupled to the voice assistant manager via a Matter network.

6. The system of claim 1, further comprising a cloud service associated with the called assistant;
   wherein the instructions, when executed by the processor, further cause the called assistant to, in response to successfully verifying the wake word, communicate the utterance to the cloud service; and
   wherein the cloud service verifies the wake word.

7. The system of claim 6, wherein the cloud service, in response to successfully verifying the wake word, processes a request of the utterance.

8. The system of claim 6, wherein the cloud service, in response to failing to verify the wake word, returns an error to the called assistant and deletes data associated with the utterance.

9. The system of claim 6, wherein the instructions, when executed by the processor, cause the called assistant to:
   receive the response from the cloud service; and
   communicate the response to one or more of the user or the voice assistant manager.

10. The system of claim 6, wherein one or more of communicating the utterance to the cloud service or communicating the utterance to the called assistant comprises sending a plurality of audio files, the plurality of audio files including an encrypted audio file and an unencrypted audio file;
   wherein the unencrypted audio file includes the wake word; and
   wherein the encrypted audio file includes one or more of the utterance or a request of the utterance.

11. The system of claim 1, wherein the instructions, when executed by the processor, further cause the voice assistant manager to:
   receive a subscription request from the called assistant, the subscription request including the wake word;
   associate the wake word with the called assistant; and
   train a machine learning model to recognize the wake word.

12. The system of claim 1, further comprising a computing device, wherein the computing device includes the voice assistant manager, the plurality of voice assistants, the processor, and the memory.

13. The system of claim 12, wherein the computing device includes a screen displaying a user interface; and
   wherein the user interface includes a plurality of voice assistant icons, wherein each icon of the plurality of voice assistant icons corresponds with a voice assistant of the plurality of voice assistants.

14. A method for processing voice requests, the method comprising:
   receiving an utterance from a user;
   detecting, at a voice assistant manager, a wake word in the utterance using a first wake word detection model;
   identifying, from a plurality of voice assistants, a called assistant associated with the wake word;
   communicating the utterance to the called assistant;
   detecting, at the called assistant, the wake word in the utterance using a second wake word detection model, wherein the second wake word detection model is trained to recognize one or more wake words, and wherein detecting the wake word at the called assistant comprises inputting the utterance into the second wake word detection model;
   generating a response to the utterance; and
   transmitting the response to the user.

15. The method of claim 14, further comprising:
   transmitting the utterance to a cloud service; and
   detecting, at the cloud service, the wake word in the utterance;
   wherein generating the response to the utterance is performed at the cloud service.

16. The method of claim 14, further comprising:
   prior to communicating the utterance to the called assistant, activating the called assistant;
   determining that the called assistant finished processing the utterance; and
   deactivating the called assistant.

17. The method of claim 14, further comprising:
   subscribing the called assistant;
   wherein subscribing the called assistant comprises (i) receiving one or more wake words associated with the called assistant, the one or more wake words associated with the called assistant including the wake word and (ii) training a machine learning model to detect the one or more wake words,
   wherein detecting, at the voice assistant manager, the wake word in the utterance comprises inputting the utterance into the machine learning model.

18. A device for processing voice commands, the device comprising:

a processor; and memory coupled to the processor, the memory storing instructions that, when executed by the processor cause the device to:

receive an utterance;

detect a wake word in the utterance using a first wake word detection model;

identify, from a plurality of voice assistants, a called assistant associated with the wake word;

communicate the utterance to the called assistant;

detecting, at the called assistant, the wake word in the utterance using a second wake word detection model, wherein the second wake word detection model is trained to recognize one or more wake words, and wherein detecting the wake word at the called assistant comprises inputting the utterance into the second wake word detection model;

generate, at the called assistant, a response to the utterance; and transmit the response to a user.

19. The device of claim 18, wherein detecting the wake word in the utterance using the first wake word detection model is performed at a voice assistant manager; and wherein the instructions, when executed by the processor, further cause the device to:

prior to communicating the utterance to the called assistant, activate the called assistant; and after generating the response to the utterance, deactivate the called assistant.

\* \* \* \* \*